United States Patent
Lee et al.

(10) Patent No.: US 10,951,245 B2
(45) Date of Patent: Mar. 16, 2021

(54) ELECTRONIC DEVICE AND METHOD FOR SWITCHING ANTENNA THEREOF

(71) Applicant: Samsung Electronics Co., Ltd, Gyeonggi-do (KR)

(72) Inventors: Sang Youn Lee, Gyeonggi-do (KR); Ho Saeng Kim, Gyeonggi-do (KR); Young Sik Choi, Gyeonggi-do (KR); Seung Nyun Kim, Incheon (KR); Dong Il Son, Gyeonggi-do (KR)

(73) Assignee: Samsung Electronics Co., Ltd., Suwon-si (KR)

(*) Notice: Subject to any disclaimer, the term of this patent is extended or adjusted under 35 U.S.C. 154(b) by 556 days.

(21) Appl. No.: 15/491,867

(22) Filed: Apr. 19, 2017

(65) Prior Publication Data

US 2017/0310344 A1 Oct. 26, 2017

(30) Foreign Application Priority Data

Apr. 22, 2016 (KR) .................... 10-2016-0049113

(51) Int. Cl.

| H04B 1/44 | (2006.01) |
| H04B 1/10 | (2006.01) |
| H04B 1/04 | (2006.01) |
| H01Q 21/00 | (2006.01) |
| H01Q 1/24 | (2006.01) |
| H01Q 9/04 | (2006.01) |
| H04B 1/00 | (2006.01) |
| H04W 88/06 | (2009.01) |

(52) U.S. Cl.
CPC ............. H04B 1/006 (2013.01); H04W 88/06 (2013.01)

(58) Field of Classification Search
None
See application file for complete search history.

(56) References Cited

U.S. PATENT DOCUMENTS

| 6,862,433 B2* | 3/2005 | Callaway, Jr. ......... H01Q 1/241 343/702 |
| 7,057,472 B2* | 6/2006 | Fukamachi .......... H03H 7/0115 333/101 |
| 7,907,094 B2* | 3/2011 | Kakitsu ................ H04B 1/0064 343/702 |

(Continued)

FOREIGN PATENT DOCUMENTS

JP 2007274518 A 10/2007

*Primary Examiner* — Tuan A Tran

(57) ABSTRACT

The electronic device includes a housing including a first surface and a second surface. The first surface includes a first side, a second side, a third side, and a fourth side, a first conductive member extending along the first side, a second conductive member extending along the third side, a first communication circuit including a transmission port and at least one first reception port. The at least one first reception port is electrically coupled with at least one of the first conductive member or the second conductive member, a second communication circuit including a second reception port, and a switching circuit configured to selectively provide a first electrical path for electrically coupling the transmission port and the second reception port with the first conductive member or a second electrical path for electrically coupling the transmission port and the second reception port with the second conductive member.

17 Claims, 19 Drawing Sheets

(56) References Cited

U.S. PATENT DOCUMENTS

| | | | | |
|---|---|---|---|---|
| 8,406,806 B2* | 3/2013 | Wong | .................... | H01Q 1/243 |
| | | | | 455/550.1 |
| 8,670,726 B2* | 3/2014 | Poulin | .................. | H04B 1/0064 |
| | | | | 455/78 |
| 8,725,213 B2* | 5/2014 | Nakamura | ........... | H04B 7/0802 |
| | | | | 455/562.1 |
| 8,804,560 B2* | 8/2014 | Zhao | .................... | H04B 7/082 |
| | | | | 370/252 |
| 8,868,144 B2* | 10/2014 | Shi | ....................... | H01Q 21/245 |
| | | | | 455/575.7 |
| 8,947,302 B2 | 2/2015 | Caballero et al. | | |
| 9,077,405 B2* | 7/2015 | Jones | .................... | H03F 3/195 |
| 9,225,382 B2* | 12/2015 | Khlat | ....................... | H04B 1/44 |
| 9,236,663 B2* | 1/2016 | Akhi | ...................... | H04B 1/525 |
| 9,521,563 B2* | 12/2016 | Su | ......................... | H04W 24/02 |
| 9,866,261 B2* | 1/2018 | Laurila | .................... | H04B 1/44 |
| 9,906,260 B2* | 2/2018 | Ramachandran | .... | H04B 1/3838 |
| 9,976,841 B2* | 5/2018 | McCarthy | ............. | G06F 1/1626 |
| 10,218,052 B2* | 2/2019 | Pascolini | ............. | H01Q 9/0442 |
| 10,447,323 B2* | 10/2019 | Lee | ......................... | H04B 1/18 |
| 10,447,458 B2* | 10/2019 | Chang | .................... | H04L 5/001 |
| 2002/0106995 A1* | 8/2002 | Callaway, Jr. | ......... | H01Q 1/241 |
| | | | | 455/101 |
| 2012/0112970 A1 | 5/2012 | Caballero et al. | | |
| 2013/0241800 A1* | 9/2013 | Schlub | .................. | H01Q 1/243 |
| | | | | 343/893 |
| 2013/0315076 A1* | 11/2013 | Zhao | ..................... | H04B 7/082 |
| | | | | 370/252 |
| 2015/0145734 A1 | 5/2015 | Caballero et al. | | |

\* cited by examiner

ELECTRONIC DEVICE AND METHOD FOR SWITCHING ANTENNA THEREOF

CROSS-REFERENCE TO RELATED APPLICATION(S) AND CLAIM OF PRIORITY

The present application is related to and claims the benefit under 35 U.S.C. § 119(a) of a Korean patent application filed on Apr. 22, 2016 in the Korean Intellectual Property Office and assigned Serial number 10-2016-0049113, the entire disclosure of which is hereby incorporated by reference.

TECHNICAL FIELD

The present disclosure relates to a technology for switching an antenna to be used in an electronic device including a plurality of antennas.

BACKGROUND

A wireless communication technology makes it possible to transmit and receive various forms of information such as a text, an image, a video, voice, and the like. The wireless communication technology is being developed to transmit and receive more information faster. As the wireless communication technology develops, an electronic device such as a wireless communication-possible smartphone or tablet may provide a service using a communication function such as digital multimedia broadcasting (DMB), global positioning system (GPS), wireless-fidelity (Wi-Fi), long-term evolution (LTE), near field communication (NFC), magnetic stripe transmission (MST), or the like. To provide such a service, the electronic device may include one or more antennas. The electronic device may include a complex antenna that is capable of receiving signals of a plurality of bands and/or signals corresponding to a plurality of communication manners.

An electronic device including a plurality of antennas may receive a signal using an antenna disposed at a location appropriate to receive the signal. For example, the electronic device may receive a GPS signal using an antenna located at an upper end of the electronic device and may receive an LTE communication signal using an antenna located at a lower end of the electronic device. However, an electronic device having a shape of a horizontal symmetry and/or a vertical symmetry may be grasped by a hand of a user in any direction. In the electronic device, it may be difficult to distinguish a horizontal direction and/or a vertical direction. As such, the electronic device may receive a signal using an antenna placed at an inefficient location. For example, the electronic device may be used in a state where an antenna to receive a GPS signal is placed at a lower end thereof and an antenna to receive an LTE communication signal is placed at an upper end thereof.

SUMMARY

To address the above-discussed deficiencies, it is an object to provide an electronic device and a method that are capable of selecting an antenna appropriate to receive a signal in the electronic device including a plurality of complex antennas.

In accordance with an aspect of the present disclosure, an electronic device may include a housing including a first surface facing a first direction and a second surface facing a second direction opposite to the first direction, wherein the first surface includes a first side having a first length, a second side having a second length longer than the first length, a third side having the first length, and a fourth side having the second length, the first side is perpendicular to the second side and the fourth side and is parallel with the third side, a first conductive member extending along at least a part of the first side, a second conductive member extending along at least a part of the third side, a first wireless communication circuit including a transmission port and at least one first reception port, wherein the at least one first reception port is electrically coupled with at least one of the first conductive member or the second conductive member, a second wireless communication circuit including a second reception port, and a switching circuit configured to selectively provide a first electrical path for electrically coupling the transmission port and the second reception port with the first conductive member or a second electrical path for electrically coupling the transmission port and the second reception port with the second conductive member.

In accordance with another aspect of the present disclosure, an electronic device may include a first conductive member that receives signals of two or more bands from the outside, a second conductive member that is disposed to be spaced apart from the first conductive member and receives signals of the two or more bands from the outside, a first communication circuit that processes a signal, which corresponds to a first band, from among the signals of the two or more bands, a second communication circuit that processes a signal, which corresponds to a second band, from among the signals of the two or more bands, at least one extractor that extracts a signal, which corresponds to the second band, from among signals received through the first conductive member or the second conductive member and to transmit the signal of the second band to the second communication circuit, a switching circuit that is electrically connected with the at least one extractor and is disposed on at least one of electrical paths between the first conductive member, the second conductive member, the first communication circuit, and the second communication circuit, and a control circuit that controls the at least one switching circuit based on a specified condition such that each of the first communication circuit and the second communication circuit is selectively connected with the first conductive member or the second conductive member.

In accordance with another aspect of the present disclosure, an antenna switching method of an electronic device, which includes a first conductive member, a second conductive member, a first wireless communication circuit, a second wireless communication circuit, and at least one switching circuit, may include acquiring state information of the electronic device, controlling the at least one switching circuit based on the state information such that each of the first wireless communication circuit and the second wireless communication circuit is electrically coupled with the first conductive member or the second conductive member capable of receiving a signal of a first band and a signal of a second band from the outside, and receiving the signal of the first band from a conductive member connected with the first wireless communication circuit using the first wireless communication circuit and receiving the signal of the second band from a conductive member connected with the second wireless communication circuit using the second wireless communication circuit.

Other aspects, advantages, and salient features of the disclosure will become apparent to those skilled in the art from the following detailed description, which, taken in conjunction with the annexed drawings, discloses various embodiments of the present disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Throughout the drawings, it should be noted that like reference numbers are used to depict the same or similar elements, features, and structures.

DETAILED DESCRIPTION

Figure 1:
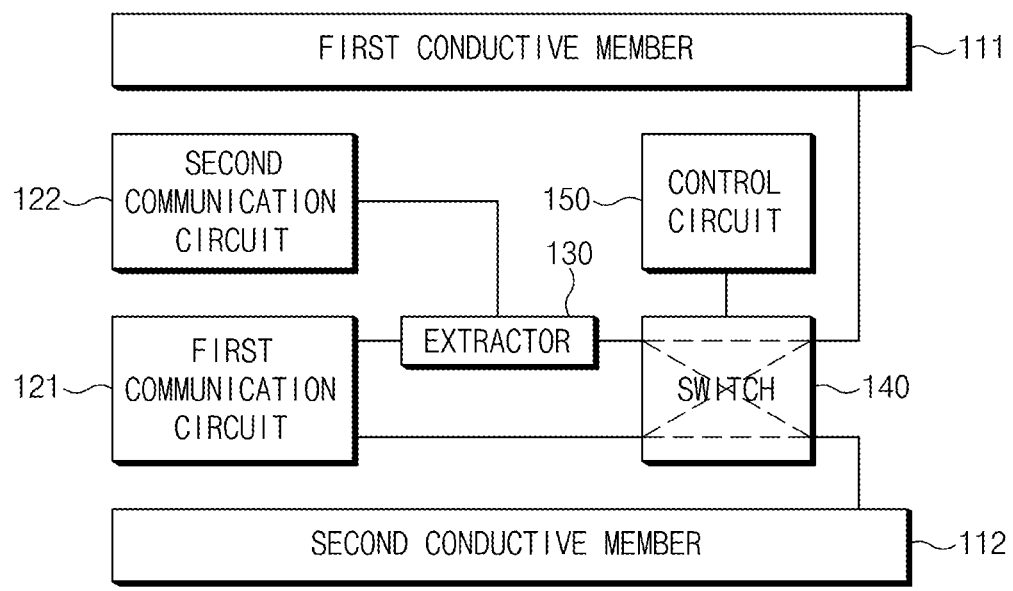
FIG. 1 is a block diagram illustrating a configuration of an electronic device, according to an embodiment.

FIGS. 1 through 19, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged electronic device.

Various embodiments of the present invention may be described with reference to accompanying drawings. Accordingly, those of ordinary skill in the art will recognize that modification, equivalent, and/or alternative on the various embodiments described herein can be variously made without departing from the scope and spirit of the present invention. With regard to description of drawings, similar elements may be marked by similar reference numerals.

In the disclosure disclosed herein, the expressions "have", "may have", "include" and "comprise", or "may include" and "may comprise" used herein indicate existence of corresponding features (e.g., elements such as numeric values, functions, operations, or components) but do not exclude presence of additional features.

In the disclosure disclosed herein, the expressions "A or B", "at least one of A or/and B", or "one or more of A or/and B", and the like used herein may include any and all combinations of one or more of the associated listed items. For example, the term "A or B", "at least one of A and B", or "at least one of A or B" may refer to all of the case (1) where at least one A is included, the case (2) where at least one B is included, or the case (3) where both of at least one A and at least one B are included.

The terms, such as "first", "second", and the like used herein may refer to various elements of various embodiments of the present disclosure, but do not limit the elements. For example, "a first user device" and "a second user device" indicate different user devices regardless of the order or priority. For example, without departing the scope of the present disclosure, a first element may be referred to as a second element, and similarly, a second element may be referred to as a first element.

It will be understood that when an element (e.g., a first element) is referred to as being "(operatively or communicatively) coupled with/to" or "connected to" another element (e.g., a second element), it may be directly coupled with/to or connected to the other element or an intervening element (e.g., a third element) may be present. In contrast, when an element (e.g., a first element) is referred to as being "directly coupled with/to" or "directly connected to" another element (e.g., a second element), it should be understood that there are no intervening element (e.g., a third element).

According to the situation, the expression "configured to" used herein may be used as, for example, the expression "suitable for", "having the capacity to", "designed to", "adapted to", "made to", or "capable of". The term "configured to" must not mean only "specifically designed to" in hardware. Instead, the expression "a device configured to" may mean that the device is "capable of" operating together with another device or other components. CPU, for example, a "processor configured to perform A, B, and C" may mean a dedicated processor (e.g., an embedded processor) for performing a corresponding operation or a generic-purpose processor (e.g., a central processing unit (CPU) or an application processor) which may perform corresponding operations by executing one or more software programs which are stored in a memory device.

Terms used in this disclosure are used to describe specified embodiments of the present invention and are not intended to limit the scope of the present invention. The terms of a singular form may include plural forms unless otherwise specified. All the terms used herein, which include technical or scientific terms, may have the same meaning that is generally understood by a person skilled in the art. It will be further understood that terms, which are defined in a dictionary and commonly used, should also be interpreted as is customary in the relevant related art and not in an idealized or overly formal detect unless expressly so defined herein in various embodiments of the present disclosure. In some cases, even if terms are terms which are defined in the disclosure, they may not be interpreted to exclude embodiments of the present disclosure.

An electronic device according to various embodiments of the present disclosure may include at least one of smartphones, tablet personal computers (PCs), mobile phones, video telephones, electronic book readers, desktop PCs, laptop PCs, netbook computers, workstations, servers, personal digital assistants (PDAs), portable multimedia players (PMPs), Motion Picture Experts Group (MPEG-1 or MPEG-2) Audio Layer 3 (MP3) players, mobile medical devices, cameras, or wearable devices. According to various embodiments, the wearable device may include at least one of an accessory type (e.g., watches, rings, bracelets, anklets, necklaces, glasses, contact lens, or head-mounted-devices (HMDs), a fabric or garment-integrated type (e.g., an electronic apparel), a body-attached type (e.g., a skin pad or tattoos), or an implantable type (e.g., an implantable circuit).

According to various embodiments, the electronic device may be a home appliance. The home appliances may include at least one of, for example, televisions (TVs), digital versatile disc (DVD) players, audios, refrigerators, air conditioners, cleaners, ovens, microwave ovens, washing machines, air cleaners, set-top boxes, TV boxes (e.g., Samsung HomeSync™, Apple TV™, or Google TV™), game consoles (e.g., Xbox™ and PlayStation™), electronic dictionaries, electronic keys, camcorders, electronic picture frames, and the like.

According to another embodiment, the photographing apparatus may include at least one of medical devices (e.g., various portable medical measurement devices (e.g., a blood glucose monitoring device, a heartbeat measuring device, a blood pressure measuring device, a body temperature measuring device, and the like), a magnetic resonance angiography (MRA), a magnetic resonance imaging (MRI), a computed tomography (CT), scanners, and ultrasonic devices), navigation devices, Global Navigation Satellite System (GNSS), event data recorders (EDRs), flight data recorders (FDRs), vehicle infotainment devices, electronic equipment for vessels (e.g., navigation systems and gyrocompasses), avionics, security devices, head units for vehicles, industrial or home robots, automatic teller's machines (ATMs), points of sales (POSs), or internet of things (e.g., light bulbs, various sensors, electric or gas meters, sprinkler devices, fire alarms, thermostats, street lamps, toasters, exercise equipment, hot water tanks, heaters, boilers, and the like).

According to an embodiment, the electronic device may include at least one of parts of furniture or buildings/structures, electronic boards, electronic signature receiving devices, projectors, or various measuring instruments (e.g., water meters, electricity meters, gas meters, or wave meters, and the like). According to various embodiments, the electronic device may be one of the above-described devices or a combination thereof. An electronic device according to an embodiment may be a flexible electronic device. Furthermore, an electronic device according to an embodiment of the present disclosure may not be limited to the above-described electronic devices and may include other electronic devices and new electronic devices according to the development of technologies.

Hereinafter, electronic devices according to various embodiments will be described with reference to the accompanying drawings. The term "user" used herein may refer to a person who uses an electronic device or may refer to a device (e.g., an artificial intelligence electronic device) that uses an electronic device.

FIG. 1 is a block diagram illustrating a configuration of an electronic device, according to an embodiment. For example, an electronic device 100 may be an electronic device 1501 illustrated in FIG. 15.

Referring to FIG. 1, the electronic device 100 may include a first conductive member 111, a second conductive member 112, a first communication circuit 121, a second communication circuit 122, an extractor 130, a switch 140, and a control circuit 150. The electronic device 100 according to an embodiment may connect the first conductive member 111 and the second conductive member 112 with the extractor 130 or the first communication circuit 121, respectively. The electronic device 100 according to an embodiment may transmit a signal, which corresponds to a first band, from among signals received by the first conductive member 111 and the second conductive member 112 to the first communication circuit 121 and may transmit a signal, which corresponds to a second band, from among the received signals to the second communication circuit 121 using the extractor 130.

The electronic device 100 according to an embodiment may support wireless communication. The electronic device 100 may include a plurality of antennas. For example, the electronic device 100 may include a plurality of complex antennas. The complex antennas may radiate or receive signals of various frequency bands. The appearance of the electronic device 100 may be symmetrical in a vertical direction and a horizontal direction. The electronic device 100 may include, for example, a display that occupies most of a front surface of the electronic device 100.

A housing of the electronic device 100 according to an embodiment may include a first surface facing a first direction and a second surface facing a second direction opposite to the first direction. For example, the first surface may be a front surface of the electronic device 100, and the second surface may be a rear surface of the electronic device 100. The first surface may include a first side having a first length, a second side having a second length longer than the first length, a third side having the first length, and a fourth side having the second length. The first side may be perpendicular to the second side and the fourth side and may be parallel with the third side. For example, the first side may be an upper end of the electronic device 100, the second side may be a left end of the electronic device 100, the third side may be a lower end of the electronic device 100, and the fourth side may be a right end of the electronic device 100.

According to an embodiment, the first conductive member 111 may receive signals of two or more bands from the outside. For example, the first conductive member 111 may receive RF signals of two or more bands among a low band (e.g., about 600 MHz to about 900 MHz), a middle band (e.g., about 1.8 GHz to about 2.1 GHz), or a high band (e.g., about 2.3 GHz to about 2.7 GHz). For another example, the first conductive member may be a radiator of a complex antenna capable of receiving two or more signals among a cellular communication signal (e.g., about 0.06 GHz to about 2.7 GHz), a GPS signal (e.g., about 1176.45 MHz, about 1227.60 MHz, about 1379.913 MHz, about 1381.05 MHz, or about 1575.42 MHz), a Wi-Fi signal (e.g., about 2.4 GHz or about 5 GHz), an NFC signal (e.g., about 13.56 MHz), or an MST signal (e.g., about 700 KHz). The first conductive member 111 may extend along at least a part of the first side, for example.

According to an embodiment, the second conductive member 112 may receive signals of two or more bands from the outside. The second conductive member 112 may be, for example, a radiator of a complex antenna capable of receiving two or more signals among a cellular communication signal, a GPS signal, a Wi-Fi signal, an NFC signal, or an MST signal. The second conductive member 112 may be disposed to be spaced apart from the first conductive member 111. The second conductive member 112 may extend along at least a part of the third side, for example.

According to an embodiment, the first communication circuit 121 may receive a signal of the first band among two or more bands. For example, the first communication circuit 121 may process one of an RF signal of the low band, an RF signal of the middle band, an RF signal of the high band, a GPS signal, a Wi-Fi signal, an NFC signal, or an MST signal.

According to an embodiment, the first communication circuit 121 may process a cellular communication signal. The first communication circuit 121 may include a main signal processing block and a diversity signal processing block. For example, the main signal processing block may be connected with the switch 140, and the diversity signal processing block may be connected with the extractor 130. The first communication circuit 121 may include a transmission port connected with the main signal processing block and a first reception part connected with the diversity signal processing block. The first reception port may be electrically coupled with at least one of the first conductive member 111 or the second conductive member 112. The first communication circuit 121 may be configured to provide wireless communication in a frequency range corresponding to a cellular communication signal, a GPS signal, a Wi-Fi signal, an NFC signal, or an MST signal.

According to an embodiment, the second communication circuit 122 may be a circuit for processing a signal of the second band among two or more bands. For example, the second communication circuit 122 may process a signal, which is different from the signal processed in the first communication circuit 121, from among a cellular communication signal, a GPS signal, a Wi-Fi signal, an NFC signal, or an MST signal.

According to an embodiment, the second communication circuit 122 may process a GPS signal. The second communication circuit 122 may include a second reception port. The second reception port may be connected with the extractor 130. The second reception port may be electrically coupled with at least one of the first conductive member 111 or the second conductive member 112 through the extractor 130. The first communication circuit 122 may be configured to provide wireless communication in a frequency range corresponding to a cellular communication signal, a GPS signal, a Wi-Fi signal, an NFC signal, or an MST signal.

According to an embodiment, the extractor 130 may extract a signal, which corresponds to a specified frequency band, from among input signals. For example, the extractor 130 may be configured to extract a signal, which corresponds to the second band, from among signals received through the first conductive member 111 or the second conductive member 112 and to transmit the extracted signal of the second band to the second communication circuit 122.

According to an embodiment, the extractor 130 may include a first node coupled with a second wireless communication circuit, a second node coupled with a switching circuit, and a third node coupled with a first wireless communication circuit. The extractor 130 may be configured to transmit a signal, which corresponds to the second band, from among signals received through the switch 140 to the second communication circuit 122. For example, the extractor 130 may be configured to transmit a GPS signal among signals received through the switch 140 to the second communication circuit 122.

According to an embodiment, the switch 140 (or switching circuit) may be electrically connected with the extractor 130 and may be disposed on an electrical path between the first conductive member 111, the second conductive member 112, the first communication circuit 121, and the second communication circuit 122. For example, the switch 140 may be configured to selectively provide a first electrical path for electrically coupling the transmission port and the second reception port to the first conductive member 111 or a second electrical path for electrically coupling the transmission port and the second reception port to the second conductive member 112.

According to an embodiment, the switch 140 may be disposed to connect one of the first conductive member 111 or the second conductive member 112 directly with the first communication circuit 121 and to connect the other of the first conductive member 111 or the second conductive member 112 to at least one extractor 130. For example, the switch 140 may electrically connect the extractor 130 with the first conductive member 111 and the first communication circuit 121 with the second conductive member 112 so as not to pass through the extractor 130, along electrical paths parallel with each other in the switch 140. For another example, the switch 140 may electrically connect the first communication circuit 121 with the first conductive member 111 so as not to pass through the extractor 130 and the extractor 130 with the second conductive member 112, along electrical paths crossing each other in the switch 140.

According to an embodiment, the control circuit 150 may control the switch 140 based on a specified condition such that each of the first communication circuit 121 and the second communication circuit 122 is selectively connected with the first conductive member 111 or the second conductive member 112. For example, on the basis of the specified condition, the control circuit 150 may control the switch 140 such that one of the first conductive member 111 or the second conductive member 112 is connected with the main signal processing block of the first communication circuit 121 and the other of the first conductive member 111 or the second conductive member 112 is connected with the diversity processing block of the first communication circuit 121 and the second communication circuit 122.

For example, the control circuit 150 may control the switch 140 to allow electrical paths in the switch 140 to be parallel with each other. In this case, the first conductive member 111 may be electrically connected with the diversity signal processing block of the first communication circuit 121 and the second communication circuit 122 through the extractor 130. A signal received by the first conductive member 111 may be transmitted to the extractor 130. A signal, which corresponds to the first band, from among signals received by the first conductive member 111 may be transmitted to the diversity signal processing block of the first communication circuit 121, and a signal, which corresponds to the second band, from among the received signals may be transmitted to the second communication circuit 122 after being extracted by the extractor 130. The second conductive member 112 may be connected with the main signal processing block of the first communication circuit 121. A signal received by the second conductive member 112 may be transmitted to the main signal processing block, and a signal generated by the main signal processing block may be radiated through the second conductive member 112.

In detail, the electronic device 100 may respectively receive a cellular communication signal and a GPS signal using the first conductive member 111 and the second conductive member 112. For example, since a GPS signal is received from a satellite located above the electronic device 100, the electronic device 100 may receive the GPS signal using a conductive member, which is placed at the top, from among the first conductive member 111 and the second conductive member 112. For another example, since a cellular communication signal has bad influence on a brain of the user, the electronic device 100 may receive the cellular communication signal using a conductive member, which is placed at the bottom, from among the first conductive member 111 and the second conductive member 112.

For example, in the case where the first conductive member 111 is placed over the second conductive member 112, the control circuit 150 may control the switch 140 to allow electrical paths in the switch 140 to be parallel with each other. In this case, a signal received by the first conductive member 111 may be transmitted to the extractor 130. The first conductive member 111 may receive a diversity cellular communication signal and a GPS signal. The diversity cellular communication signal among signals received by the first conductive member 111 may be transmitted to the diversity signal processing block of the first communication circuit 121 processing the cellular communication signal, and the GPS signal among the received signals may be transmitted to the second communication circuit 122 processing the GPS signal after being extracted by the extractor 130. A main cellular communication signal received by the second conductive member 112 may be transmitted to the main signal processing block, and a signal generated by the main signal processing block may be radiated through the second conductive member 112. The second conductive member 112 may transmit and receive a main cellular communication signal.

For another example, the control circuit 150 may control the switch 140 to allow electrical paths in the switch 140 to cross each other. In this case, the first conductive member 111 may be connected with the main signal processing block of the first communication circuit 121. A signal received by the first conductive member 111 may be transmitted to the main signal processing block, and a signal generated by the main signal processing block may be radiated through the first conductive member 111. The second conductive member 112 may be electrically connected with the diversity signal processing block of the first communication circuit 121 and the second communication circuit 122 through the extractor 130. A signal received by the second conductive member 112 may be transmitted to the extractor 130. A signal, which corresponds to the first band, from among signals received by the second conductive member 112 may be transmitted to the diversity signal processing block of the first communication circuit 121, and a signal, which corresponds to the second band, from among the received signals may be transmitted to the second communication circuit 122 after being extracted by the extractor 130.

For example, in the case where the first conductive member 111 is placed below the second conductive member 112, the control circuit 150 may control the switch 140 to allow electrical paths in the switch 140 to cross each other. In this case, a signal received by the second conductive member 112 may be transmitted to the extractor 130. The second conductive member 112 may receive a diversity cellular communication signal and a GPS signal. The cellular communication signal among signals received by the second conductive member 112 may be transmitted to the diversity signal processing block of the first communication circuit 121 processing the cellular communication signal, and the GPS signal among the received signals may be transmitted to the second communication circuit 122 processing the GPS signal after being extracted by the extractor 130. A main cellular communication signal received by the first conductive member 111 may be transmitted to the main signal processing block, and a signal generated by the main signal processing block may be radiated through the first conductive member 111. The first conductive member 111 may transmit and receive a main cellular communication signal.

According to an embodiment, the control circuit 150 may control the switch 140 based on a received signal strength indication (RSSI) of a signal received through the first conductive member 111 or the second conductive member 112 such as each of the first communication circuit 121 and the second communication circuit 122 is selectively connected with the first conductive member 111 or the second conductive member 112. For example, while using cellular communication, the control circuit 150 may control the switch 140 such that a conductive member, of which the RSSI is high, from among the first conductive member 111 or the second conductive member 112 is electrically connected with the main signal processing block of the first communication circuit 121. For another example, while using a GPS signal, the control circuit 150 may control the switch 140 such that a conductive member of which the RSSI is high is electrically connected with the diversity signal processing block of the first communication circuit 121 and the second communication circuit 122.

According to an embodiment, the control circuit 150 may control the switch 140 such that the second communication circuit 12 is connected with a conductive member, which is placed at the top, from among the first conductive member 111 or the second conductive member 112. For example, while using GPS, to receive a GPS signal from a satellite located above the electronic device 100, the control circuit 150 may control the switch 140 such that the second communication circuit 112 is connected with a conductive member, which is placed at the top, from among the first conductive member 111 or the second conductive member 112.

Figure 2:
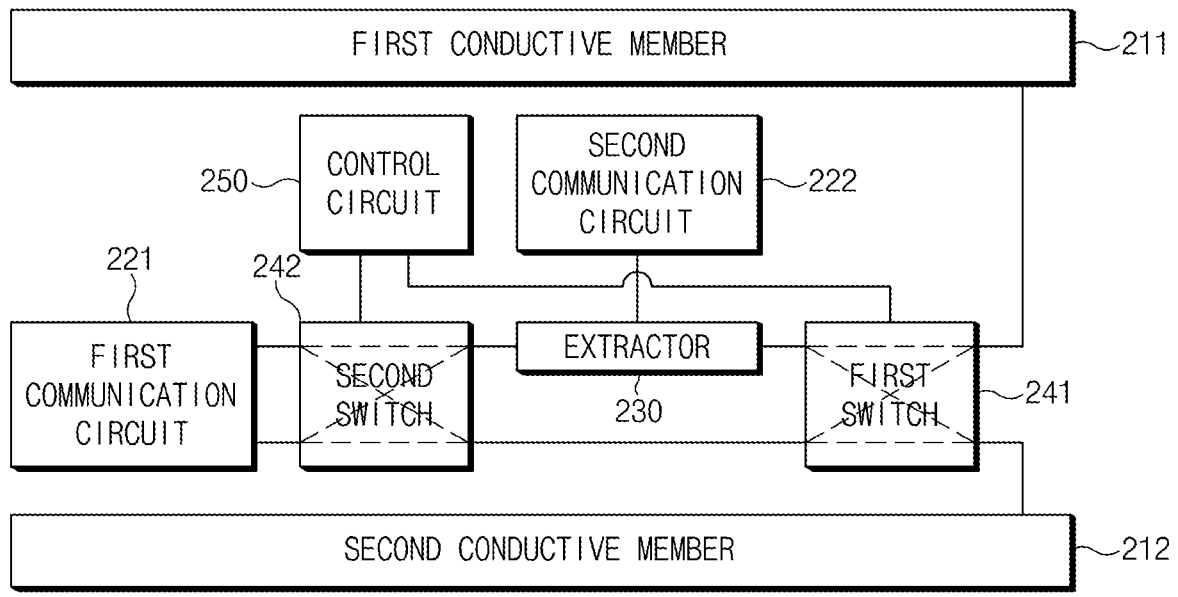
FIG. 2 is a block diagram illustrating a configuration of the electronic device, according to an embodiment.

FIG. 2 is a block diagram illustrating a configuration of an electronic device, according to an embodiment. For example, an electronic device 200 may be an electronic device 1501 illustrated in FIG. 15.

Referring to FIG. 2, the electronic device 200 may include a first conductive member 211, a second conductive member 212, a first communication circuit 221, a second communication circuit 222, an extractor 230, a first switch 241, a second switch 242, and a control circuit 250. The electronic device 200 according to an embodiment may connect one of the first conductive member 211 and the second conductive member 212 with the extractor 230 using the first switch 241 and may connect each of the first conductive member 211 and the second conductive member 212 with a main signal processing block or a diversity signal processing block of the first communication circuit 221 using the second switch 242. The electronic device 200 according to an embodiment may transmit a signal, which corresponds to a first band, from among signals received by the first conductive member 211 and the second conductive member 212 to the first communication circuit 221 and may transmit a signal, which corresponds to a second band, from among the received signals to the second communication circuit 222 using the extractor 230.

The first conductive member 211, the second conductive member 212, the first communication circuit 221, and the second communication circuit 222 may be the same as the first conductive member 111, the second conductive member 112, the first communication circuit 121, and the second communication circuit 122.

According to an embodiment, the extractor 230 may be coupled between the first switch 241 and the second switch 242. For example, the extractor 230 may be connected with the first switch 241 and the second switch 242. The extractor 230 may be coupled with second communication circuit 222. For example, the extractor 230 may be electrically connected with second communication circuit 222. In this specification, that "A" and "B" are connected may mean that "A" and "B" are electrically or operatively connected, as well as that "A" and "B" are physically connected. The extractor 230 may be configured to transmit a signal, which corresponds to the second band, from among signals received through the first switch 241 to the second communication circuit 222. For example, the extractor 230 may transmit a signal (e.g., a cellular communication signal), which corresponds to the first band, from among signals received through the first switch 241 to the diversity signal processing block of the first communication circuit 221 through the second switch 242. The extractor 230 may be configured to extract a signal (e.g., a GPS signal), which corresponds to the second band, from among signals received through the first switch 241 and to transmit the extracted signal to the second communication circuit 222.

According to an embodiment, the first switch 241 may be coupled with the first conductive member 211 and the second conductive member 212. For example, the first switch 241 may be connected with the first conductive member 211 and the second conductive member 212 through different paths. The first switch 241 may be disposed to connect one of the first conductive member 211 or the second conductive member 212 directly with the second switch 242 or to connect the other of the first conductive member 211 or the second conductive member 212 to the extractor 230. For example, the first switch 241 may electrically connect the first conductive member 211 with the extractor 230 and the second conductive member 212 directly with the second switch 242, along electrical paths parallel with each other in the first switch 241. For another example, the first switch 241 may electrically connect the first conductive member 211 directly with the second switch 242 and the second conductive member 212 with the extractor 230, along electrical paths crossing each other in the first switch 241.

According to an embodiment, the second switch 242 may be coupled between the first communication circuit 221 and the extractor 230. For example, the second switch 242 may be connected with the first communication circuit 221 and the extractor 230. The second switch 242 may be configured to electrically connect the extractor 230 and the first switch 241 with the first communication circuit 221. In detail, the second switch 242 may be configured to selectively connect each of the extractor 230 and the first switch 241 with the main signal processing block or the diversity signal processing block of the first communication circuit 221. For example, the switch 242 may connect the diversity signal processing block of the first communication circuit 221 with the extractor 130 and the main signal processing block of the first communication circuit 221 with the first switch 241, along electrical paths parallel with each other in the second switch 242. For another example, the second switch 242 may connect the main signal processing block of the first communication circuit 221 with the extractor 230 and the diversity signal processing block of the first communication circuit 221 with the first switch 241, along electrical paths crossing each other in the second switch 242.

According to an embodiment, the control circuit 250 may control the first switch 241 and the second switch 242 based on a specified condition such that each of the first communication circuit 221 and the second communication circuit 222 is selectively connected with the first conductive member 211 or the second conductive member 212. For example, the control circuit 250 may control the first switch 241 and the second switch 242 based on at least one of a grip state, acceleration, angular velocity, or illuminance. In detail, the control circuit 250 may control the first switch 241 and the second switch 242 such that a conductive member, which is placed at the top, from among the first conductive member 211 and the second conductive member 212 is connected with the second communication circuit 222 and a conductive member, which is placed at the bottom, from among the first conductive member 211 and the second conductive member 212 is connected with the first communication circuit 221. For another example, the control circuit 250 may control the first switch 241 and the second switch 242 such that a conductive member connected with the first communication circuit 221 and the second communication circuit 222 is switched if the electronic device 200 rotates at a specified angle (e.g., 180 degrees). For another example, the electronic device 250 may control the first switch 241 and the second switch 242 such that the second conductive member 212 is connected with the first communication circuit 221 and/or the second communication circuit 222 if the first conductive member 211 makes contact with a hand of the user. For another example, the electronic device 250 may control the first switch 241 and the second switch 242 such that the first conductive member 211 is connected with the first communication circuit 221 and/or the second communication circuit 222 if the second conductive member 212 comes close to an external object. An operation of the control circuit 250 illustrated in FIG. 2 will be described with reference to FIGS. 10 and 11 in detail.

Figure 3:
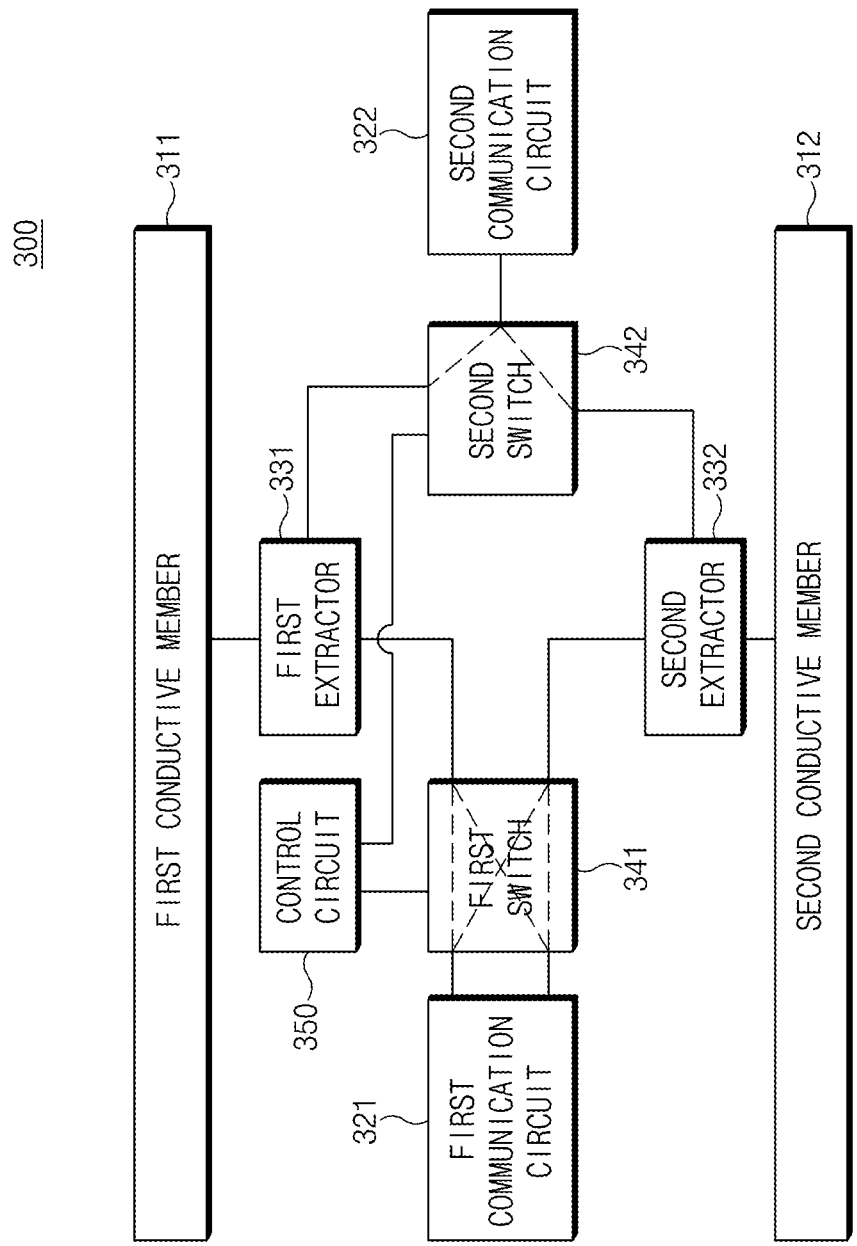
FIG. 3 is a block diagram illustrating a configuration of an electronic device, according to an embodiment.

FIG. 3 is a block diagram illustrating a configuration of an electronic device, according to an embodiment. For example, an electronic device 300 may be an electronic device 1501 illustrated in FIG. 15.

Referring to FIG. 3, the electronic device 300 may include a first conductive member 311, a second conductive member 312, a first communication circuit 321, a second communication circuit 322, a first extractor 331, a second extractor 332, a first switch 341, a second switch 342, and a control circuit 350. The electronic device 300 according to an embodiment may transmit a signal, which corresponds to a first band, from among signals received by the first conductive member 311 and the second conductive member 312 to the first switch 341 and a signal, which corresponds to a second band, from among the received signals to the second switch 342, using the first extractor 331 and the second extractor 332. The electronic device 300 according to an embodiment may connect each of the first conductive member 311 and the second conductive member 312 with a main signal processing block or a diversity signal processing block of the first communication circuit 321. The electronic device 300 according to an embodiment may connect one, which receives a signal of the second band, from among the first conductive member 311 and the second conductive member 312 with the second communication circuit 322 using the second switch 342.

The first conductive member 311, the second conductive member 312, the first communication circuit 321, and the second communication circuit 322 may be the same as the first conductive member 111, the second conductive member 112, the first communication circuit 121, and the second communication circuit 122 of FIG. 1, respectively.

According to an embodiment, the first extractor 331 may be coupled with the first conductive member 311 and the second switch 342. For example, the first extractor 331 may be connected with the first conductive member 311, the first switch 341, and the second switch 342. In the case where the second communication circuit 322 is connected with the first conductive member 311 through the second switch 342, the first extractor 331 may be configured to extract a signal, which corresponds to the second band, from among signals received through the first conductive member 311 and to transmit the extracted signal of the second band to the second communication circuit 322 through the second switch 342. The first extractor 331 may transmit a signal, which corresponds to the first band, from among signals received through the first conductive member 311 to the first communication circuit 321 through the first switch 341.

According to an embodiment, the second extractor 332 may be coupled with the second conductive member 312 and the second switch 342. For example, the second extractor 332 may be connected with the second conductive member 312, the first switch 341, and the second switch 342. In the case where the second conductive member 312 and the second communication circuit 312 are connected through the second switch 342, the second extractor 332 may be configured to extract a signal, which corresponds to the second band, from among signals received through the second conductive member 312 and to transmit the extracted signal of the second band to the second communication circuit 322 through the second switch 342. The second extractor 332 may transmit a signal, which corresponds to the first band, from among signals received through the second conductive member 312 to the first communication circuit 321 through the first switch 341.

According to an embodiment, the first switch 341 may be coupled with the first extractor 331, the second extractor 332, and the first communication circuit 321. For example, the first switch 341 may be connected with the first extractor 331, the second extractor 332, and the first communication circuit 321. The first switch 341 may be disposed to connect the first communication circuit 321 with the first conductive member 311 through the first extractor 331 or to connect the first communication circuit 321 with the second conductive member 312 through the second extractor 332. For example, the first switch 341 may connect a diversity signal processing block of the first communication circuit 321 with the first conductive member 311 and a main signal processing block of the first communication circuit 321 with the second conductive member 312 along electrical paths parallel with each other in the first switch 341. For another example, the first switch 341 may connect the main signal processing block of the first communication circuit 321 with the first conductive member 311 and the diversity signal processing block of the first communication circuit 321 with the second conductive member 312 along electrical paths crossing with each other in the first switch 341.

According to an embodiment, the second switch 342 may be coupled with the first extractor 331, the second extractor 332, and the second communication circuit 322. For example, the second switch 342 may be connected with the first extractor 331, the second extractor 332, and the second communication circuit 322. The second switch 342 may connect the second communication circuit 322 with the first conductive member 311 or the second conductive member 312. For example, the second switch 342 may be disposed to connect the second communication circuit 322 with the first conductive member 311 through the first extractor 331 or to connect the second communication circuit 322 with the second conductive member 312 through the second extractor 332.

According to an embodiment, the control circuit 350 may control the first switch 341 and the second switch 342 based on a specified condition such that each of the first communication circuit 321 and the second communication circuit 322 is selectively connected with the first conductive member 311 or the second conductive member 312. On the basis of the specified condition, the control circuit 350 may control the first switch 341 such that one of the first conductive member 311 or the second conductive member 312 is connected with the main signal processing block of the first communication circuit 321 and the other of the first conductive member 311 or the second conductive member 312 is connected with the diversity processing block of the first communication circuit 321. The control circuit 350 may control the second switch 342 based on the specified condition such that one of the first conductive member 311 or the second conductive member 312 is connected with the second communication circuit 322.

For example, the control circuit 350 may control the first switch 341 and the second switch 342 such that electrical paths in the first switch 341 are parallel with each other and the second switch 342 connects the first extractor 331 with the second communication circuit 322. In this case, a signal, which corresponds to the first band, from among signals received by the first conductive member 311 may be transmitted to the diversity signal processing block of the first communication circuit 321, and a signal, which corresponds to the second band, from among the received signals may be transmitted to the second communication circuit 322. A signal, which corresponds to the first band, from among signals received by the second conductive member 312 may be transmitted to the main signal processing block of the first communication circuit 321.

For another example, the control circuit 350 may control the first switch 341 and the second switch 342 such that the electrical paths in the first switch 341 are parallel with each other and the second switch 342 connect the second extractor 332 with the second communication circuit 322. In this case, a signal, which corresponds to the first band, from among signals received by the first conductive member 311 may be transmitted to the diversity signal processing block of the first communication circuit 321. A signal, which corresponds to the first band, from among signals received by the second conductive member 312 may be transmitted to the main signal processing block of the first communication circuit 321, and a signal, which corresponds to the second band, from among the received signals may be transmitted to the second communication circuit 322.

For another example, the control circuit 350 may control the first switch 341 and the second switch 342 such that the electrical paths in the first switch 341 cross each other and the second switch 342 connects the first extractor 331 with the second communication circuit 322. In this case, a signal, which corresponds to the first band, from among signals received by the first conductive member 311 may be transmitted to the main signal processing block of the first communication circuit 321, and a signal, which corresponds to the second band, from among the received signals may be transmitted to the second communication circuit 322. A signal, which corresponds to the first band, from among signals received by the second conductive member 312 may be transmitted to the diversity signal processing block of the first communication circuit 321.

For another example, the control circuit 350 may control the first switch 341 and the second switch 342 such that the electrical paths in the first switch 341 cross each other and the second switch 342 connects the second extractor 332 with the second communication circuit 322. In this case, a signal, which corresponds to the first band, from among signals received by the first conductive member 311 may be transmitted to the main signal processing block of the first communication circuit 321. A signal, which corresponds to the first band, from among signals received by the second conductive member 312 may be transmitted to the diversity signal processing block of the first communication circuit 321, and a signal, which corresponds to the second band, from among the received signals may be transmitted to the second communication circuit 322.

According to an embodiment, the control circuit 350 may control the first switch 341 and the second switch 342 such that the first communication circuit 321 (e.g., the main signal processing block of the first communication circuit 321) is connected with a conductive member, of which the RSSI is relatively high, from among the first conductive member 311 or the second conductive member 312 and the second communication circuit 322 is connected with a conductive member, which is placed at the top, from among the first conductive member 311 or the second conductive member 312. The main signal processing block of the first communication circuit 321 and the second communication circuit 322 may be connected with the same conductive member or may be connected with different conductive member. In this case, the first communication circuit 321 may be, for example, a cellular module, and the second communication circuit 322 may be, for example, a GPS module. According to the above description, communication that is based on the first communication circuit 321 and the second communication circuit 322 may be smoothly performed regardless of a direction of an electronic device.

Figure 4:
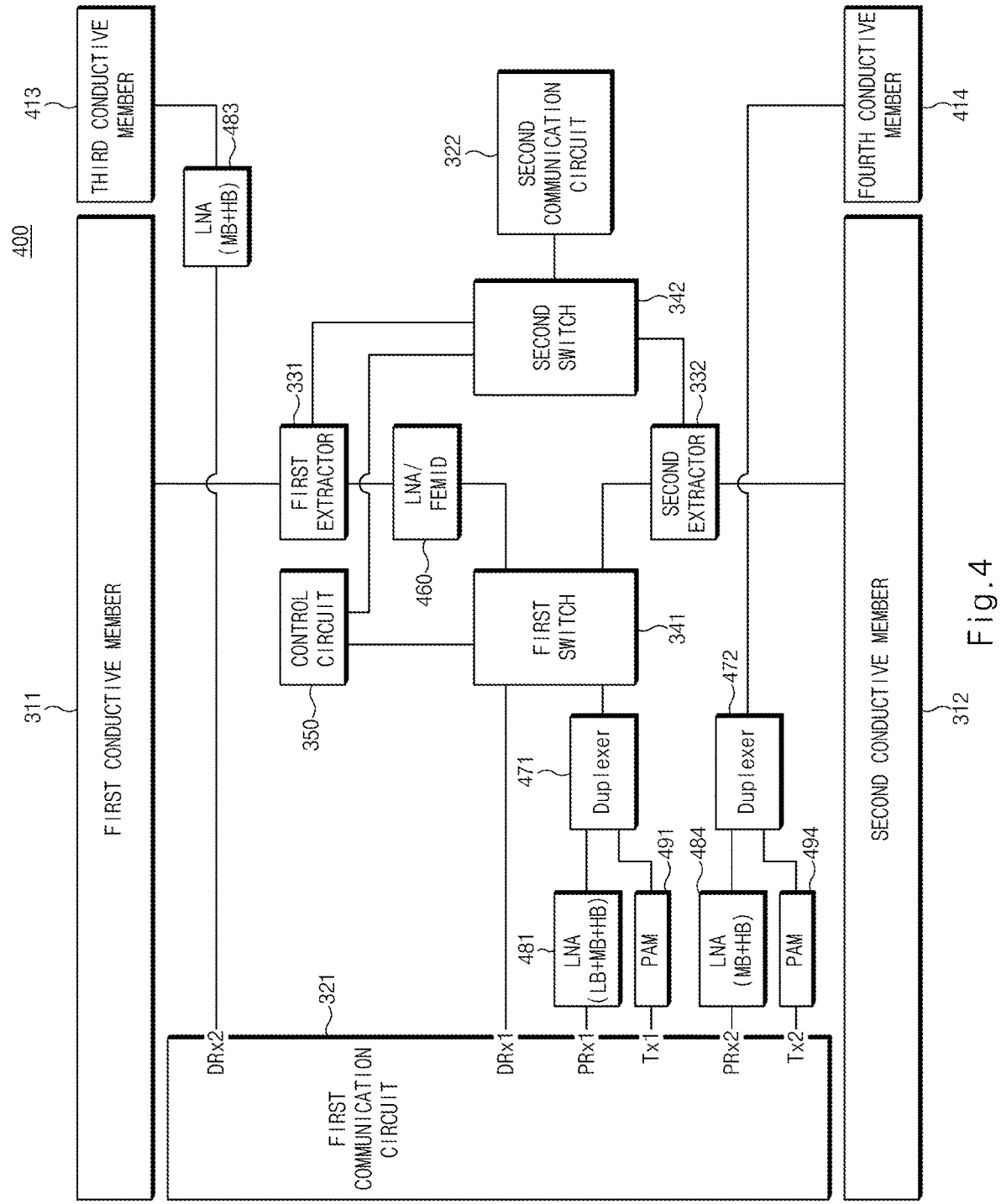
FIG. 4 is a block diagram illustrating a configuration of the electronic device, according to an embodiment.

FIG. 4 is a block diagram illustrating a configuration of an electronic device, according to an embodiment. For example, an electronic device 400 may be an electronic device 1501 illustrated in FIG. 15.

Referring to FIG. 4, the electronic device 400 may further include a third conductive member 413, a fourth conductive member 414, an LNA/FEMID module 460, duplexers 471 and 472, low noise amplifiers (LNAs) 481, 483, and 484, and power amplifiers (PAMs) 491 and 494. The first communication circuit 321 may include a first transmission block Tx1, a second transmission block Tx2, a first main signal reception block PRx1, a second main signal reception block PRx2, a first diversity signal reception block DRx1, and a second diversity signal reception block DRx2.

According to an embodiment, the LNA/FEMID module 460 may include an LNA and a FEMID. The LNA/FEMID module 460 may transmit a signal received through the first conductive member 311 to the first switch 341 after amplifying or separating the signal. The LNA/FEMID module 460 may transmit a signal generated by the first communication circuit 321 to the first conductive member 311 after amplifying or separating the signal.

According to an embodiment, each of the duplexers 471 and 472 may separate a transmit signal and a receive signal. Each of the duplexers 471 and 472 may transmit a transmit signal generated by the first communication circuit 321 to a conductive member and may transmit a receive signal received by the conductive member to the first communication circuit 321. The duplexer 471 may transmit a signal of the first band received from the first conductive member 311 or the second conductive member 312 through the first switch 341 to the LNA 481. The duplexer 471 may transmit a signal, which is generated by the first communication circuit 321 and is amplified by the PAM 491, to the first switch 341. The duplexer 472 may transmit a signal received from the fourth conductive member 414 to the LNA 484. The duplexer 472 may transmit a signal, which is generated by the first communication circuit 321 and is amplified by the PAM 494, to the fourth conductive member 414.

According to an embodiment, each of the LNAs 481, 483, and 484 may amplify a receive signal. Each of the LNAs 481, 483, and 484 may amplify a signal received by a conductive member and may transmit the amplified signal to the first communication circuit 321. The LNA 481 may amplify a low-band, middle-band, and/or high-band signal transmitted from the duplexer 471 and may transmit the amplified signal to the first main signal reception block PRx1 of the first communication circuit 321. The LNA 483 may amplify a middle-band and/or high-band signal transmitted from the third conductive member 413 and may transmit the amplified signal to the second diversity signal reception block DRx2 of the first communication circuit 321. The LNA 484 may amplify a middle-band and/or high-band signal transmitted from the duplexer 472 and may transmit the amplified signal to the second main signal reception block PRx2 of the first communication circuit 321.

According to an embodiment, each of the PAMs 491 and 494 may amplify a transmit signal. Each of the PAMs 491 and 494 may amplify a signal generated by the first communication circuit 321 and may transmit the amplified signal to a conductive member. The PAM 491 may transmit a signal generated by the first transmission block Tx1 of the first communication circuit 321 to the duplexer 471. The PAM 494 may transmit a signal generated by the second transmission block Tx2 of the first communication circuit 321 to the duplexer 472.

Figure 5:
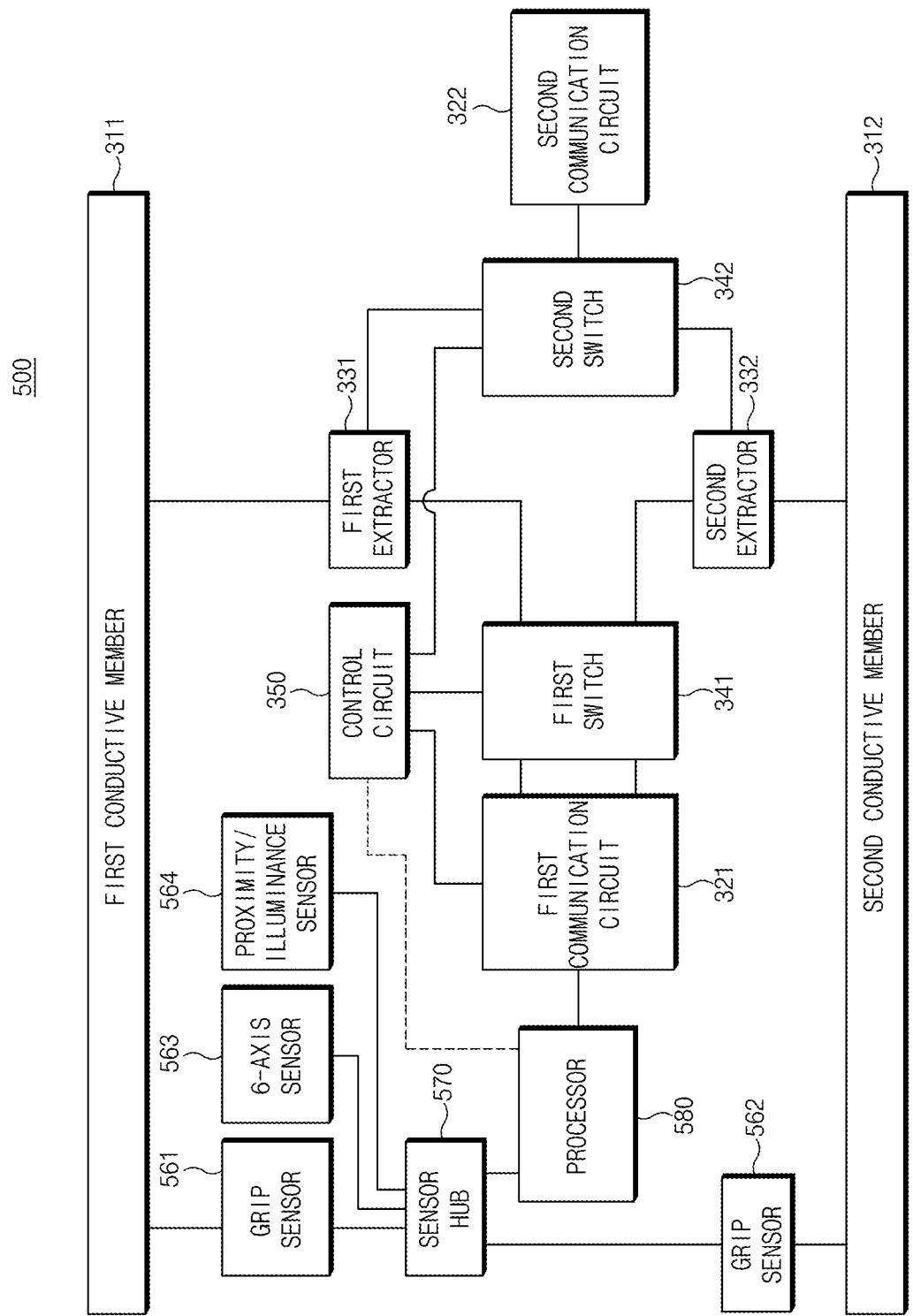
FIG. 5 is a block diagram illustrating a configuration of the electronic device, according to an embodiment.

FIG. 5 is a block diagram illustrating a configuration of an electronic device, according to an embodiment. For example, an electronic device 500 may be an electronic device 1501 illustrated in FIG. 15.

Referring to FIG. 5, the electronic device 500 may include grip sensors 561 and 562, a 6-axis sensor 563, a proximity/illuminance sensor 564, a sensor hub 570, and a processor 580. According to an embodiment, the electronic device 500 may control the first switch 341 and the second switch 342 using data acquired by the grip sensors 561 and 562, the 6-axis sensor 563, and the proximity/illuminance sensor 564.

According to an embodiment, each of the grip sensors 561 and 562 may sense a contact of a user with the electronic device 500. The grip sensors 561 and 562 may be electrically respectively connected with the first and second conductive members 311 and 312. The grip sensors 561 and 562 may sense contacts of the user with the first conductive member 311 and the second conductive member 312.

According to an embodiment, the 6-axis sensor 563 may sense acceleration and angular velocity acting on the electronic device 500. The 6-axis sensor 563 may sense the rotation of the electronic device 500. The 6-axis sensor 563 may be implemented with one module or may be implemented with two or more modules, for example, an acceleration sensor and an angular velocity sensor.

According to an embodiment, the proximity/illuminance sensor 564 may sense proximity of an external object to the electronic device 500 and may sense illuminance of light outside the electronic device 500. The proximity/illuminance sensor 564 may be implemented with one module or may be implemented with independent modules respectively corresponding to proximity and illuminance sensors.

According to an embodiment, the sensor hub 570 may connect the processor 580 with the grip sensors 561 and 562, the 6-axis sensor 563, and the proximity/illuminance sensor 564. The sensor hub 570 may transmit information sensed by the grip sensors 561 and 562, the 6-axis sensor 563, and the proximity/illuminance sensor 564 to the processor 580.

According to an embodiment, the processor 580 may be electrically connected with the first communication circuit 321. The processor 580 may control the control circuit 350 through the first communication circuit 321. The processor 580 may be directly connected with the control circuit 350 and may directly control the control circuit 350.

According to an embodiment, the processor 580 may determine a conductive member to be connected with the first communication circuit 321 and the second communication circuit 322 based on at least one of a grip state, acceleration, an angular velocity, a proximity state, or illuminance measured by the grip sensors 561 and 562, the 6-axis sensor 563, and/or the proximity/illuminance sensor 564. For example, the processor 580 may determine such that a conductive member, which is placed at the top, from among the first conductive member 311 and the second conductive member 312 is connected with the second communication circuit 322 and a conductive member, which is placed at the bottom, from among the first conductive member 311 and the second conductive member 312 is connected with the first communication circuit 321. For another example, the processor 580 may determine such that a conductive member connected with the first communication circuit 321 and the second communication circuit 322 is switched if the electronic device 300 rotates at a specified angle (e.g., 180 degrees). For another example, the processor 580 may determine such that the second conductive member 312 is connected with the first communication circuit 321 and/or the second communication circuit 322 if the first conductive member 311 makes contact with a hand of the user. For another example, the processor 580 may determine such that the first conductive member 311 is connected with the first communication circuit 321 and/or the second communication circuit 322 if the second conductive member 312 comes close to an external object. The processor 580 may control the control circuit 350 such that the determined conductive member is connected with the first communication circuit 321 and/or the second communication circuit 322.

According to an embodiment, on the basis of at least one of a grip state, acceleration, an angular velocity, a proximity state, or illuminance measured by the grip sensors 561 and 562, the 6-axis sensor 563, and/or the proximity/illuminance sensor 564, the control circuit 350 may control the first switch 341 and the second switch 342 such that each of the first communication circuit 321 and the second communication circuit 322 is selectively connected with the first conductive member 311 or the second conductive member 312. For example, the control circuit 350 may control the first switch 341 and the second switch 342 based on a command received from the processor 580. For example, the control circuit 350 may control the first switch 341 and the second switch 342 such that the first communication circuit 321 is connected with a conductive member, of which the RSSI is relatively high, from among the first conductive member 311 or the second conductive member 312 and the second communication circuit 322 is connected with a conductive member, which is placed at the top, from among the first conductive member 311 or the second conductive member 312.

Figure 6:
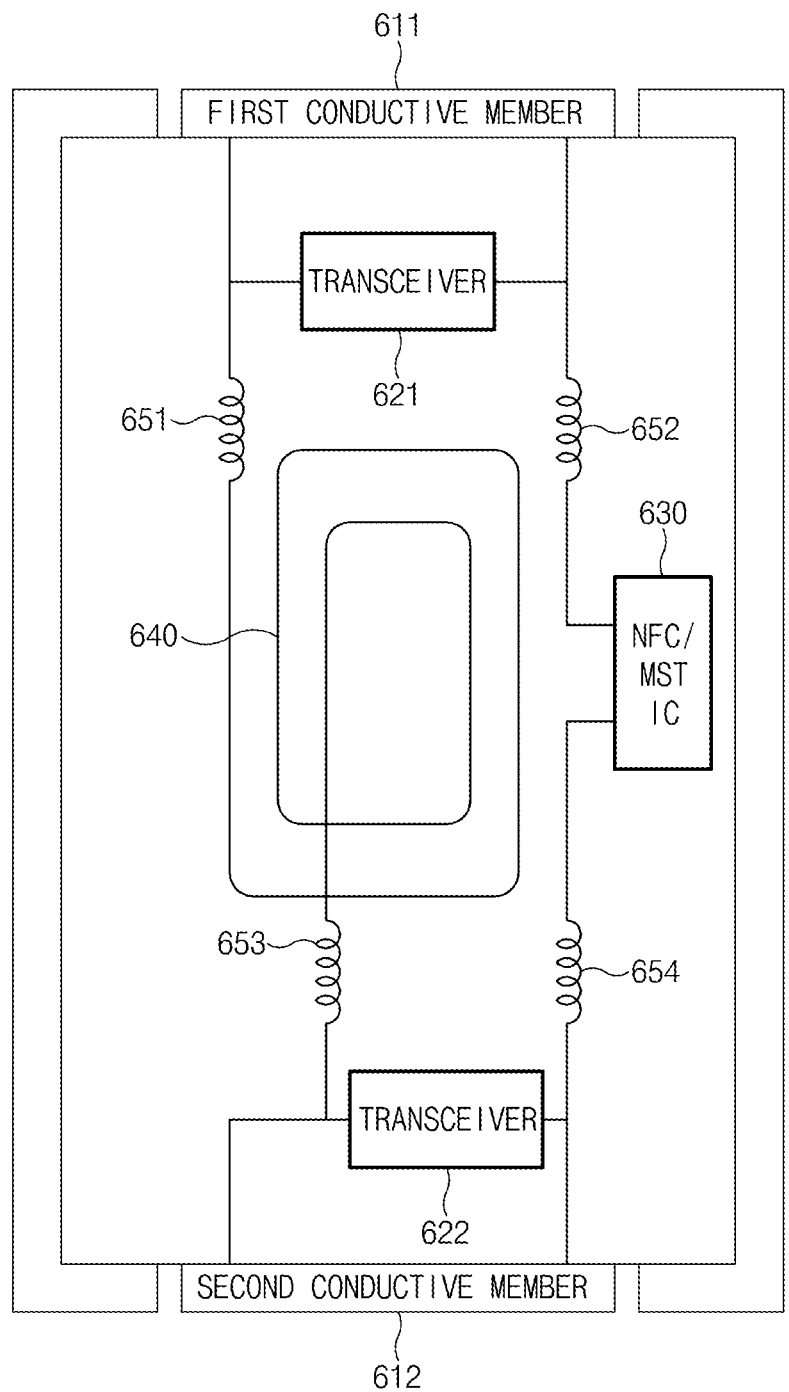
FIG. 6 is a block diagram illustrating a configuration of the electronic device, according to an embodiment.

FIG. 6 is a block diagram illustrating a configuration of an electronic device, according to an embodiment. For example, an electronic device 600 may be an electronic device 1501 illustrated in FIG. 15.

Referring to FIG. 6, the electronic device 600 may include a first conductive member 611, a second conductive member 612, transceivers 621 and 622, an NFC/MST IC 630, and a loop antenna 640.

According to an embodiment, the first conductive member 611 and the second conductive member 612 may be electrically connected with the loop antenna 640 and the NFC/MST IC 630 through inductive elements 651, 652, 653, and 654. The inductive elements 651, 652, 653, and 654 may block signals to be transmitted or received by transceivers 621 and 622 and may have an inductance value enough to transmit an NFC signal or an MST signal. The inductive elements 651, 652, 653, and 654 may be implemented with lines. The NFC/MST IC 630 may generate an NFC signal or an MST signal and may transmit the generated signal to the first conductive member 611 and the second conductive member 612 and may receive an NFC signal or an MST signal from the first conductive member 611 and the second conductive member 612. The loop antenna 640 may transmit an NFC signal or an MST signal to the first conductive member 611 and the second conductive member 612. The NFC signal or the MST signal may be radiated through the first conductive member 611 and the second conductive member 612.

According to an embodiment, the first conductive member 611 and the second conductive member 612 may be the same as the first conductive member 111 and the second conductive member 112 of FIG. 1.

According to an embodiment, the transceivers 621 and 622 may radiate a communication signal using the first conductive member 611 or the second conductive member 612 and may receive a communication signal from the first conductive member 611 or the second conductive member

612. A frequency of a communication signal to be transmitted or received by transceivers 621 and 622 may be higher than a frequency of an NFC signal (e.g., about 13.56 MHz) or an MST signal (e.g., about 700 KHz). Accordingly, a communication signal to be transmitted or received by the transceivers 621 and 622 may be blocked by the inductive elements 651, 652, 653, and 654 disposed between the transceiver 621 and the loop antenna 640 and between the transceiver 622 and the NFC/MST IC 630.

According to an embodiment, the NFC/MST IC 630 may generate an NFC signal or an MST signal to be transmitted to the outside or may receive an NFC signal or an MST signal from the outside. The NFC/MST IC 630 may be implemented with one module or may be implemented with independent modules respectively corresponding to NFC and MST modules. The NFC/MST IC 630 may be connected with the first conductive member 611 and the second conductive member 612 through the inductive elements 652 and 654. A frequency of an NFC signal or an MST signal generated by the NFC/MST IC 630 may be lower than a frequency of a communication signal to be transmitted or received by the transceivers 621 and 622. Accordingly, an NFC signal or an MST signal may be transmitted to the first conductive member 611 or the second conductive member 612 from the NFC/MST IC 630 through the inductive elements 652 and 654. Also, an NFC signal or an MST signal may be transmitted to the NFC/MST IC 630 from the first conductive member 611 or the second conductive member 612 through the inductive elements 652 and 654.

According to an embodiment, the loop antenna 640 may be connected with the first conductive member 611, the second conductive member 612, and the transceivers 621 and 622 through the inductive elements 651 and 653. A frequency of an NFC signal or an MST signal flowing through the loop antenna 640 may be lower than a frequency of a communication signal to be transmitted or received by the transceivers 621 and 622. Accordingly, an NFC signal or an MST signal may be transmitted to the first conductive member 611 or the second conductive member 612 from the loop antenna 640 through the inductive elements 651 and 653. Also, an NFC signal or an MST signal may be transmitted to the loop antenna 640 from the first conductive member 611 or the second conductive member 612 through the inductive elements 651 and 653.

According to an embodiment, since an NFC signal and an MST signal are radiated or received through the first conductive member 611 and the second conductive member 612, in the case where the top and the bottom of an electronic device are not distinguished, NFC communication or MST communication with an external device may be performed even though the electronic device makes close to the external device in any direction of the top and the bottom of the electronic device.

Figure 7:
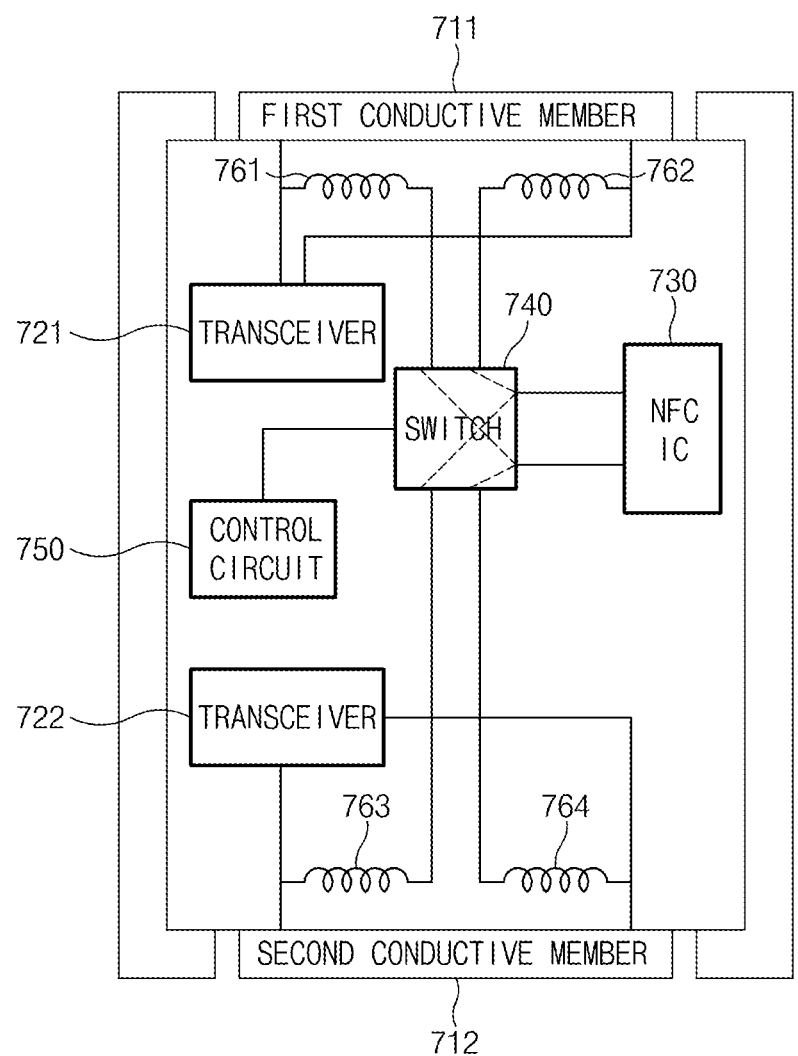
FIG. 7 is a block diagram illustrating a configuration of the electronic device, according to an embodiment.

FIG. 7 is a block diagram illustrating a configuration of an electronic device, according to an embodiment. For example, an electronic device 700 may be an electronic device 1501 illustrated in FIG. 15.

Referring to FIG. 7, the electronic device 700 may include a first conductive member 711, a second conductive member 712, transceivers 721 and 722, an NFC IC 730, a switch 740, and a control circuit 750.

According to an embodiment, the first conductive member 711 and the second conductive member 712 may be electrically connected with the switch 740 through inductive elements 761, 762, 763, and 764. The switch 740 may selectively connect the NFC IC 730 with the first conductive member 711 or the second conductive member 712 through the inductive elements 761, 762, 763, and 764. The switch 740 may electrically connect a conductive member, which is placed at the top, from among the first conductive member 711 or the second conductive member 712 with the NFC IC 730. An NFC signal may be transmitted to the NFC IC 730 from the first conductive member 711 or the second conductive member 712 through the inductive elements 761, 762, 763, and 764 or may be transmitted to the first conductive member 711 or the second conductive member 712 from the NFC IC 730 through the inductive elements 761, 762, 763, and 764. The first conductive member 711 or the second conductive member 712 may receive or radiate an NFC signal (e.g., about 13.56 MHz).

According to an embodiment, the first conductive member 711, the second conductive member 722, and the transceivers 721 and 722 may be the same as the first conductive member 611, the second conductive member 622, and the transceivers 621 and 622 of FIG. 6.

According to an embodiment, the NFC IC 730 may generate an NFC signal and may transmit the generated NFC signal to the outside. The NFC IC 730 may receive an NFC signal from the outside. The NFC IC 730 may be connected with the switch 740 and may be electrically connected with the first conductive member 711 or the second conductive member 712 through the switch 740.

According to an embodiment, the switch 740 may be connected with the NFC IC 730 and the control circuit 750. The switch 740 may be connected with the first conductive member 711 and the second conductive member 712 through the inductive elements 761, 762, 763 and 764. The switch 740 may selectively connect the NFC IC 730 with the first conductive member 711 or the second conductive member 712. The inductive elements 761, 762, 763, and 764 may have inductance enough to pass an NFC signal. An NFC signal may be transmitted to the first conductive member 711 or the second conductive member 712 from the switch 740 through the inductive elements 761, 762, 763, and 764. An NFC signal may be transmitted to the switch 740 from the first conductive member 711 or the second conductive member 712 through inductive elements 761, 762, 763, and 764.

According to an embodiment, the control circuit 750 may control the switch 740. The control circuit 750 may control the switch 740 such that the first conductive member 711 or the second conductive member 712 is selectively connected with the NFC IC 730. For example, the control circuit 750 may control the switch 740 such that the NFC IC 730 is connected with a conductive member, which is placed at the top, from among the first conductive member 711 or the second conductive member 712. For another example, the control circuit 750 may control the switch 740 such that the NFC IC 730 is connected with a conductive member, which does not make contact with the user, from among the first conductive member 711 or the second conductive member 712.

Figure 8:
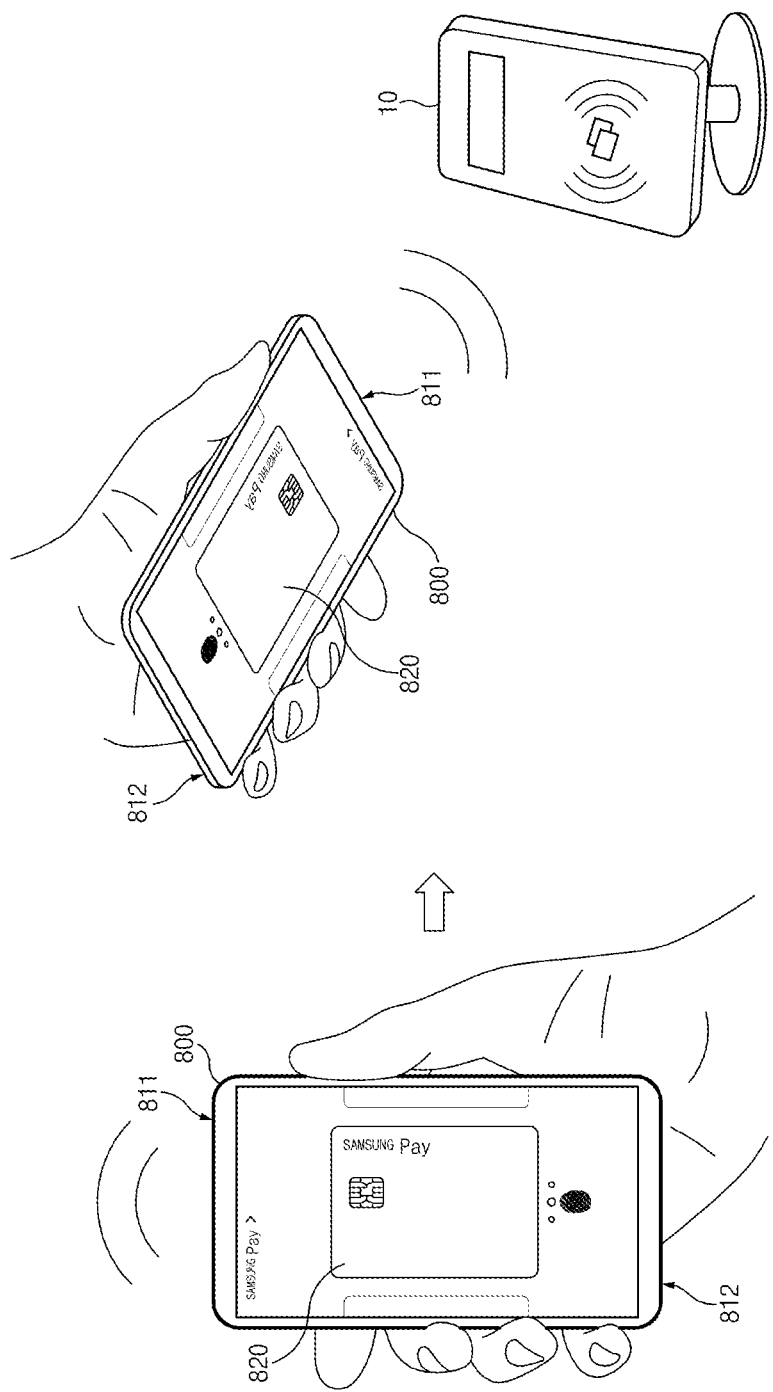
FIG. 8 illustrates an example in which payment is performed using the electronic device, according to an embodiment.

FIG. 8 illustrates an example in which payment is performed using an electronic device, according to an embodiment.

Referring to FIG. 8, an electronic device 800 may include a first antenna 811, a second antenna 812, and a display 820.

The electronic device 800, the first antenna 811, and the second antenna 812 may be the same as the electronic device 700, the first conductive member 711, and the second conductive member 712 of FIG. 7.

According to an embodiment, the electronic device 800 may execute a payment application. If the payment application is executed, the electronic device 800 may radiate an NFC signal for payment to the outside. The electronic device 800 may radiate an NFC signal through an antenna placed at the top when the payment application is executed. For example, the electronic device 800 may radiate an NFC signal through the first antenna 811. According to an embodiment, the electronic device 800 may determine an antenna, which is placed at the top, from among a plurality of antennas using one or more sensors of a grip sensor, an acceleration sensor, an angular velocity sensor, a proximity sensor, or an illuminance sensor and may radiate an NFC signal through the antenna determined as being placed at the top.

According to an embodiment, the electronic device 800 may be moved by the user for communication with an external device 10. In the case where the electronic device 800 comes close to the external device 10, the electronic device 800 may be inclined by the user. In this case the first antenna 811 may be placed at the bottom with respect to the second antenna 812. The electronic device 800 may maintain radiation through the first antenna 811 such that an antenna through which an NFC signal is radiated is not switched into the second antenna 812 placed at the top with respect to the first antenna 811. For example, the electronic device 800 may radiate an NFC signal through the first antenna 811, which is placed at the top when the payment application is executed, until payment ends.

According to various embodiments, the electronic device 800 may radiate an NFC signal by alternately using the first antenna 811 and the second antenna 812. For example, after the electronic device 800 radiates an NFC signal through the first antenna placed at the top at a point in time when the payment application is executed, the electronic device 800 may radiate the NFC signal by alternately using the first antenna 811 and the second antenna 812.

Figure 9:
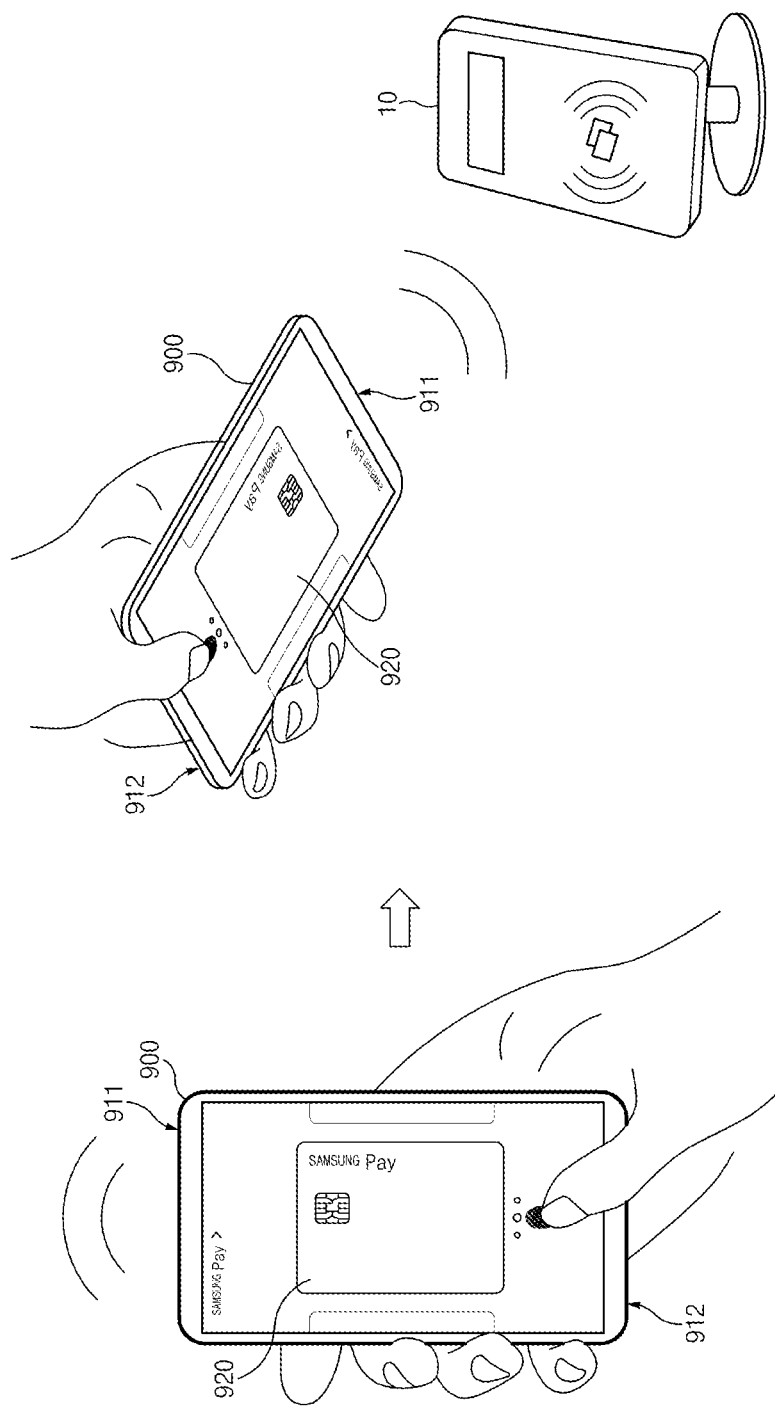
FIG. 9 illustrates an example in which payment is performed using the electronic device, according to an embodiment.

FIG. 9 illustrates an example in which payment is performed using an electronic device, according to an embodiment.

Referring to FIG. 9, an electronic device 900 may include a first antenna 911, a second antenna 912, and a display 920.

The electronic device 900, the first antenna 911, the second antenna 912, and the display 920 may be the same as the electronic device 800, the first antenna 911, the second antenna 912, and the display 820 of FIG. 8.

According to an embodiment, the electronic device 900 may execute a payment application. If the payment application is executed, the electronic device 900 may radiate an NFC signal for payment to the outside. The electronic device 900 may radiate an NFC signal through an antenna placed at the top when the payment application is executed. For example, the electronic device 900 may radiate an NFC signal through the first antenna 911.

According to an embodiment, the electronic device 900 may be moved by the user for communication with the external device 10. In the case where the electronic device 900 comes close to the external device 10, the electronic device 900 may be inclined by the user. In this case, the first antenna 911 may be placed at the bottom with respect to the second antenna 912. The electronic device 900 may maintain radiation through the first antenna 911 such that an antenna through which an NFC signal is radiated is not switched into the second antenna 912 placed at the top with respect to the first antenna 911. For example, since the probability that a finger of the user makes contact with a lower end of the electronic device 900 upon executing an application is high, the electronic device 900 may radiate an NFC signal through an antenna further away from a point at which a finger of the user makes contact with the display 920. The electronic device 900 may recognize a point, with which a finger of the user makes contact, using a touch panel and may radiate an NFC signal through an antenna, which is far away from the point, with which the finger of the user makes contact, from among the first antenna 911 and the second antenna 912.

Figure 10B:
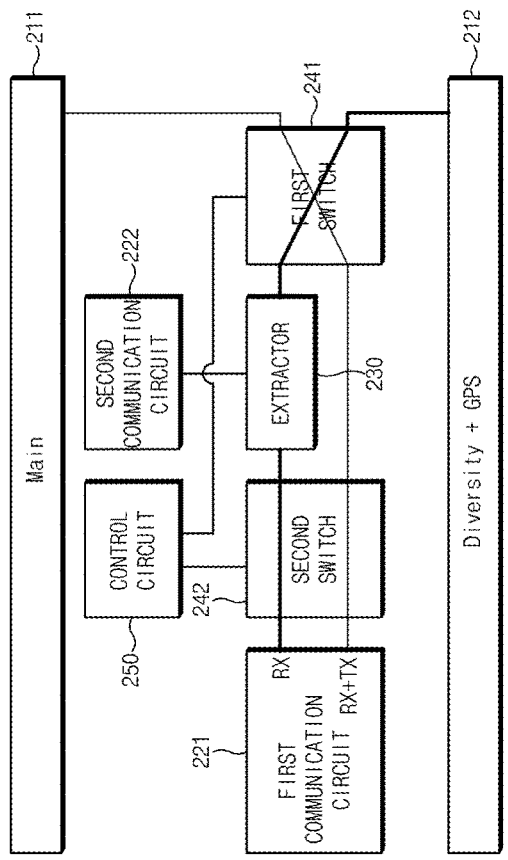
FIGS. 10A to 10D are block diagrams illustrating configurations of the electronic device, according to an embodiment.
Figure 10D:
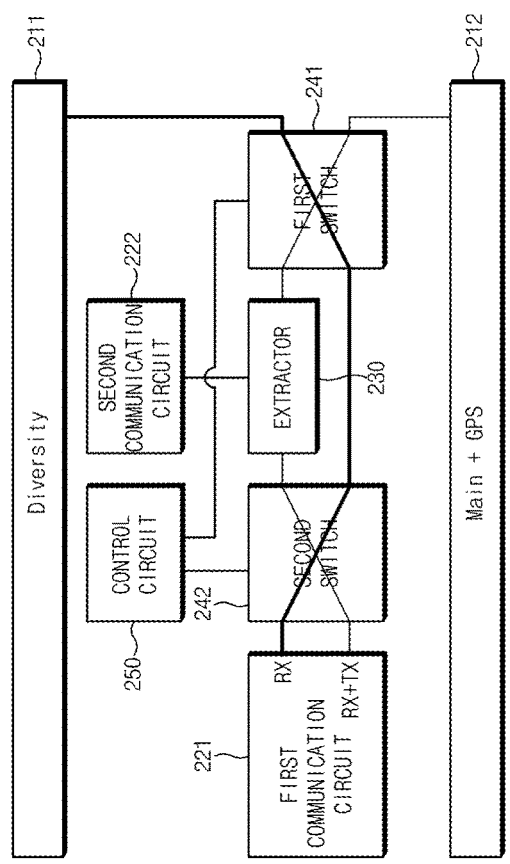
Figure 10A:
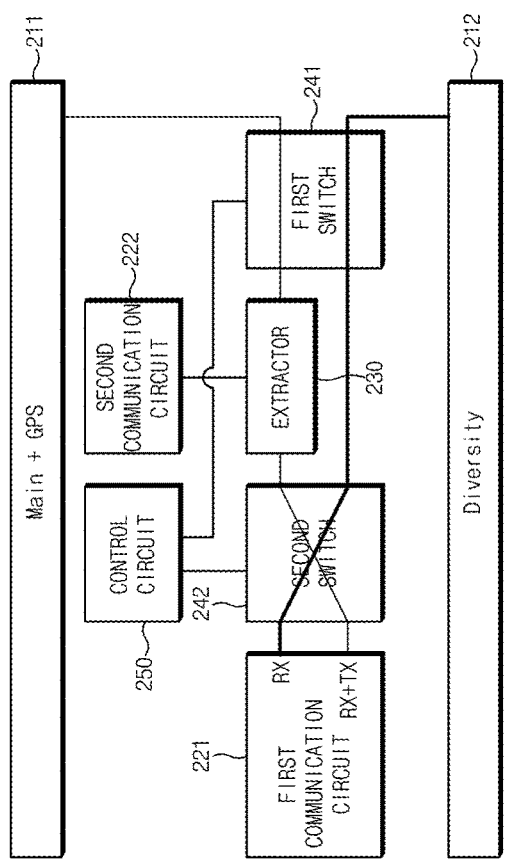
Figure 10C:
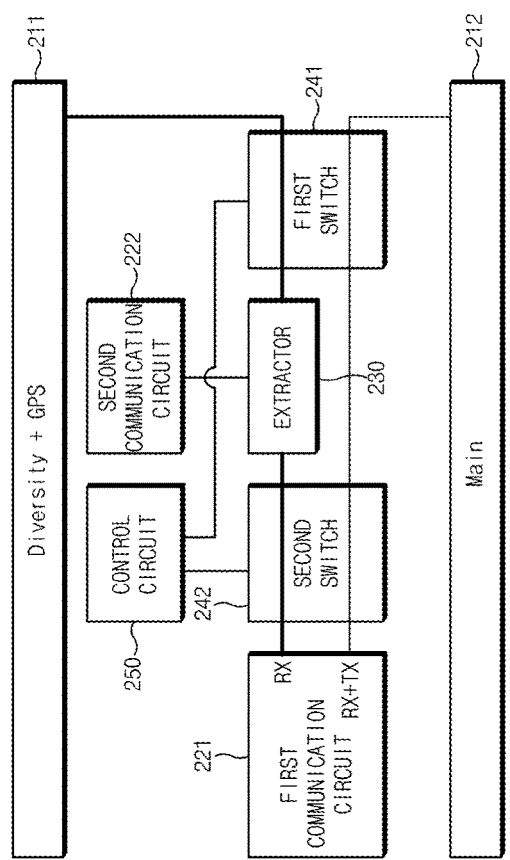
Figure 11:
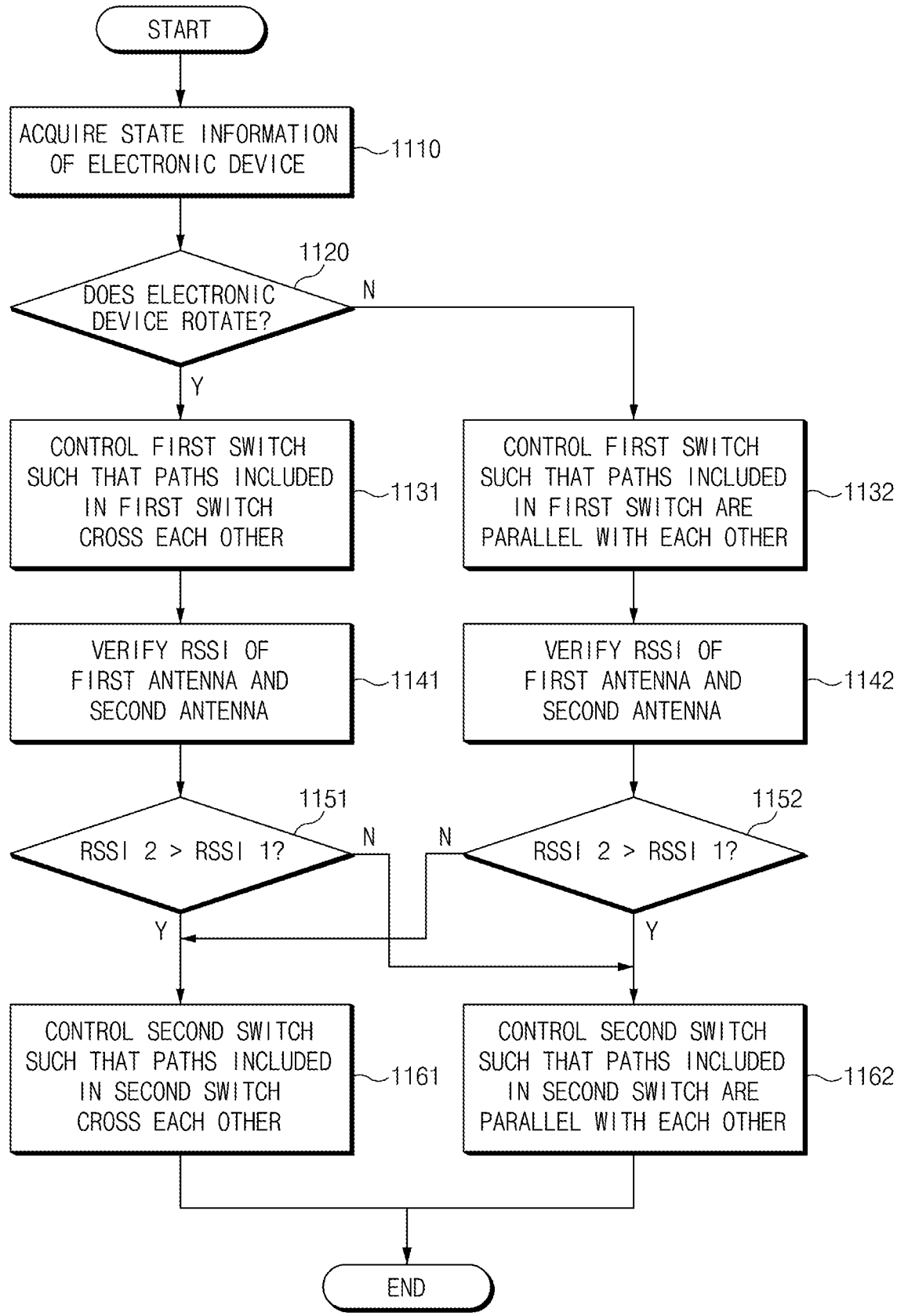
FIG. 11 is a flowchart for describing an antenna switching method of the electronic device, according to an embodiment.

FIGS. 10A to 10D are block diagrams illustrating configurations of an electronic device, according to an embodiment. FIG. 11 is a flowchart for describing an antenna switching method of an electronic device, according to an embodiment.

In operation 1110, an electronic device (e.g., the electronic device 200 of FIG. 2) may acquire information about a state of the electronic device 200. For example, the electronic device 200 may acquire information about a state of the electronic device 200 through a processor (e.g., the processor 580 of FIG. 5) included in the electronic device 200. For example, the electronic device 200 may acquire information about a grip state, acceleration, an angular velocity, a proximity state, or illuminance using a grip sensor, an acceleration sensor, and an angular velocity sensor, a proximity sensor, and/or an illuminance sensor.

In operation 1120, the electronic device 200 may determine whether the electronic device 200 rotates. For example, the electronic device 200 may determine whether the electronic device 200 rotates, through the processor included in the electronic device 200. For example, the electronic device 200 may determine whether the electronic device 200 rotates, based on information about a grip state, acceleration, an angular velocity, a proximity state, or illuminance. In the case where the electronic device 200 rotates within a specified angle range (e.g., 170 degrees to 190 degrees), the electronic device 200 may determine that the electronic device 200 rotates.

In the case where the determination result of operation 1120 indicates that the electronic device 200 rotates, in operation 1131, the electronic device 200 may control paths of the first switch 241. For example, the electronic device 200 may control the first switch 241 through the control circuit 250 included in the electronic device 200 such that paths included in the first switch 241 cross each other. For example, as illustrated in FIG. 10B or 10D, the electronic device 200 may control the first switch 241 such that two electrical paths in the first switch 241 cross each other. In this case, the second antenna 212 may be connected with the extractor 230, and the first antenna 211 may be connected with the second switch 242.

In the case where the determination result of operation 1120 indicates that the electronic device 200 does not rotate, in operation 1132, the electronic device 200 may control the paths of the first switch 241. For example, the electronic device 200 may control the first switch 241 through the control circuit 250 included in the electronic device 200 such that paths included in the first switch 241 are parallel with each other. For example, as illustrated in FIG. 10A or 10C, the electronic device 200 may control the first switch 241 such that the electrical paths in the first switch 241 are parallel with each other. In this case, the first antenna 211 may be connected with the extractor 230, and the second antenna 212 may be connected with the second switch 242.

In operation 1141 and operation 1142, the electronic device 200 may verify a received signal strength indication (RSSI). For example, the electronic device 200 may verify an RSSI associated with the first antenna 211 or the second communication circuit 212 through the first communication circuit 221 or the second communication circuit 222 included in the electronic device 200. For example, the electronic device 200 may measure an RSSI of a signal received by the first antenna 211 or an RSSI of a signal received by the second antenna 212.

In operation 1151 and operation 1152, the electronic device 200 may compare two or more RSSIs. For example, the electronic device 200 may compare an RSSI associated with the second antenna 212 and an RSSI associated with the first antenna 211 through the processor included in the electronic device 200. For example, the electronic device 200 may compare a level of the RSSI associated with the second antenna 212 and a level of the RSSI associated with the first antenna 211.

In the case where the comparison result of operation 1151 and operation 1152 indicates that the paths of the first switch 241 cross each other and the RSSI of the second antenna 212 is larger than the RSSI of the first antenna 211 or that the paths of the first switch 241 are parallel with each other and the RSSI of the first antenna 211 is larger than the RSSI of the second antenna 212, in operation 1161, the electronic device 200 may control the second switch 242. For example, the electronic device 200 may control the second switch 242 through the control circuit 250 included in the electronic device 200 such that paths included in the second switch 242 cross each other. For example, as illustrated in FIG. 10A or 10D, the electronic device 200 may control the second switch 242 such that electrical paths in the second switch 242 cross each other. If the electrical paths of the first switch 241 cross each other and the electrical paths of the second switch 242 cross each other, as illustrated in FIG. 10D, the first conductive member 211 may be connected with a diversity signal processing block of the first communication circuit 221, and the second conductive member 212 may be connected with a main signal processing block of the first communication circuit 221 and the second communication circuit 222. If the electrical paths of the first switch 241 are parallel with each other and the electrical paths of the second switch 242 cross each other, as illustrated in FIG. 10A, the first conductive member 211 may be connected with the main signal processing block of the first communication circuit 221 and the second communication circuit 222, and the second conductive member 212 may be connected with the diversity signal processing block of the first communication circuit 221.

In the case where the comparison result of operation 1151 and operation 1152 indicates that the paths of the first switch 241 cross each other and the RSSI of the first antenna 211 is larger than the RSSI of the second antenna 212 or that the paths of the first switch 241 are parallel with each other and the RSSI of the second antenna 212 is larger than the RSSI of the first antenna 211, in operation 1162, the electronic device 200 may control the second switch 242. For example, the electronic device 200 may control the second switch 242 through the control circuit 250 included in the electronic device 200 such that paths included in the second switch 242 are parallel with each other. For example, as illustrated in FIG. 10B or 10C, the electronic device 200 may control the second switch 242 such that the electrical paths in the second switch 242 are parallel with each other. If the electrical paths of the first switch 241 cross each other and the electrical paths of the second switch 242 are parallel with each other, as illustrated in FIG. 10B, the first conductive member 211 may be connected with the main signal processing block of the first communication circuit 221, and the second conductive member 212 may be connected with the diversity signal processing block of the first communication circuit 221 and the second communication circuit 222. If the electrical paths of the first switch 241 are parallel with each other and the electrical paths of the second switch 242 are parallel with each other, as illustrated in FIG. 10C, the first conductive member 211 may be connected with the diversity signal processing block of the first communication circuit 221 and the second communication circuit 222, and the second conductive member 212 may be connected with the main signal processing block of the first communication circuit 221.

Figure 12:
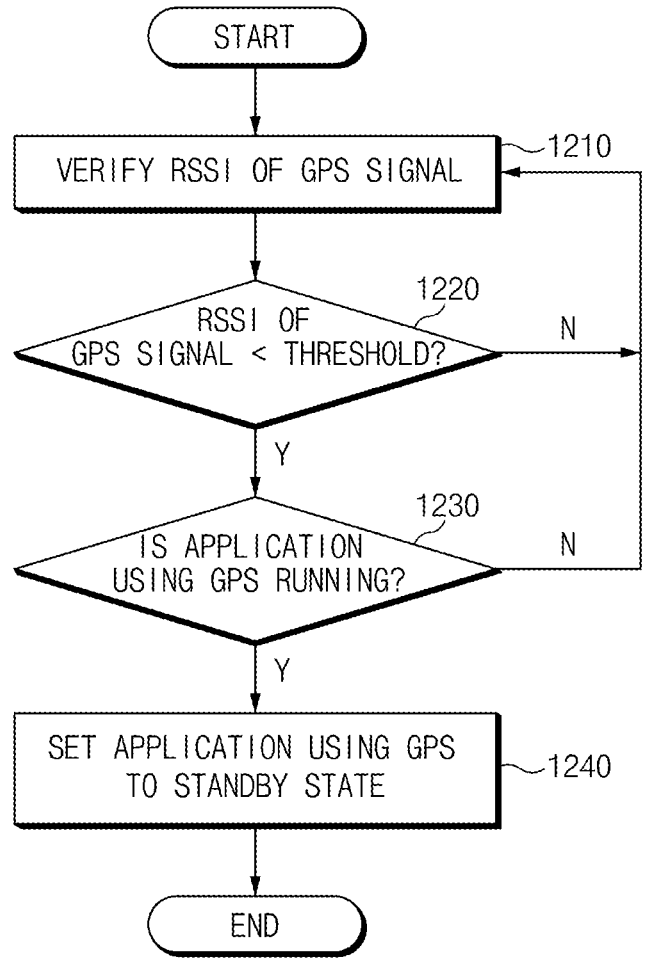
FIG. 12 is a flowchart for describing an antenna switching method of the electronic device, according to an embodiment.

FIG. 12 is a flowchart for describing an antenna switching method of an electronic device, according to an embodiment. For convenience of description, a description duplicated with an operation described with reference to FIG. 11 will not be repeated here.

The flowchart illustrated in FIG. 12 may include operations that the electronic device 100 illustrated in FIG. 1 processes. Even though omitted below, the above description of the electronic device 100 given with reference to FIG. 1 may be applied to the flowchart illustrated in FIG. 12.

According to an embodiment, the electronic device 100 may acquire information about a state of the electronic device 100. The electronic device 100 may determine whether a switching condition of an antenna is satisfied. The electronic device 100 may switch an antenna. For example, in the case where the second communication circuit 122 is connected with the first conductive member 111, the electronic device 100 may control the switch 140 such that the second communication circuit 122 is connected with the second conductive member 112.

Referring to FIG. 12, in operation 1210, the electronic device 100 may verify a received signal strength indication (RSSI). For example, the electronic device 100 may verify the RSSI of a GPS signal through a communication circuit included in the electronic device 200. For example, the electronic device 100 may measure an RSSI of the GPS signal transmitted to the second communication circuit 122 from the second conductive member 112.

In operation 1220, the electronic device 100 may determine a level of the RSSI. For example, the electronic device 100 may determine whether the RSSI of the GPS signal is lower than a threshold value, through a processor (e.g., the processor 580 of FIG. 5) included in the electronic device 100. The threshold value may be a value that is set in advance.

If the determination result of operation 1220 indicates that the RSSI is lower than the threshold value, in operation 1230, the electronic device 100 may determine whether a specified application is executed. For example, the electronic device 100 may determine whether the specified application using a GPS signal is executed, through the processor included in the electronic device 100. For example, the application using the GPS signal may be one of various applications such as a map application, a navigation application, a restaurant search application, an SNS application, and the like. If the RSSI is higher than the threshold value, the electronic device 100 may again perform operation 1210.

If the determination result of operation 1230 indicates that the application using the GPS signal is executed, in operation 1240, the electronic device 100 may control a state of the application. For example, the electronic device 100 may set the application to a standby state through the processor included in the electronic device 100. For example, if the RSSI of the GPS signal is lower than the threshold value, it may be difficult to provide a service through the application using the GPS signal. The electronic device 100 may switch a state of the application, in which it is difficult to provide a service, into the standby state. If the application using the GPS signal is not executed, the electronic device 100 may again perform operation 1210.

According to an embodiment, in the case where an application using a signal of the second band is executed in the electronic device 100, the electronic device 100 may control at least one switching circuit such that the first communication circuit 121 and the second communication circuit 122 are connected with a conductive member, which is placed at the top, from among the first conductive member 111 or the second conductive member 112. For example, in the case where the application using the GPS signal is executed in a state where the RSSI of the GPS signal is lower than the threshold value, the electronic device 100 may control the switch 140 such that an antenna connected with the second communication circuit 122 is switched.

Figure 13:
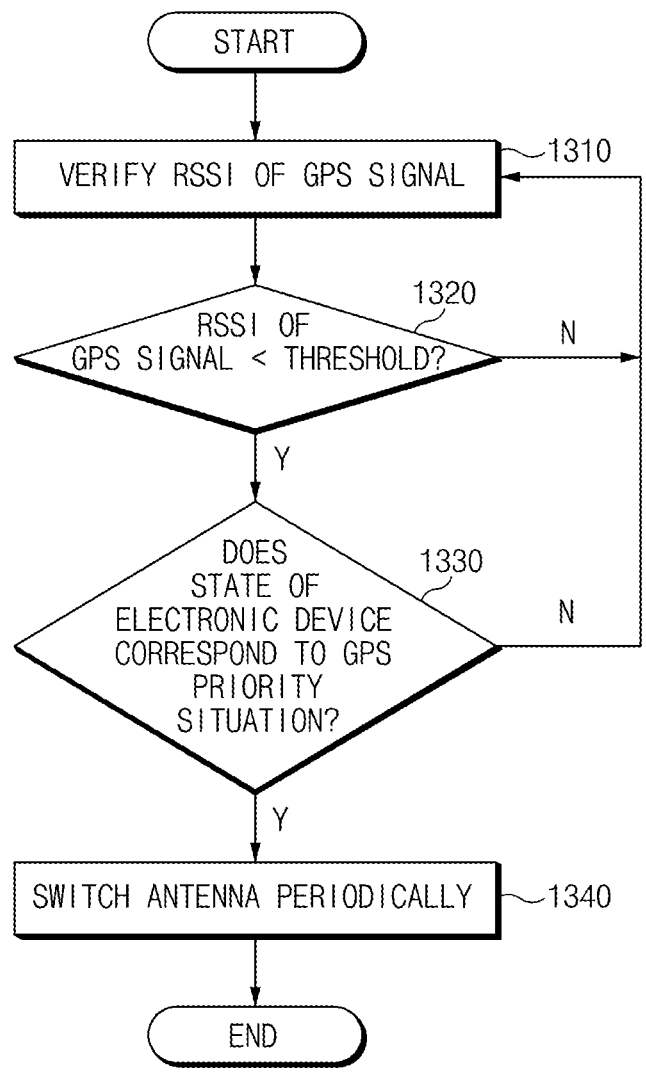
FIG. 13 is a flowchart for describing an antenna switching method of the electronic device, according to an embodiment.

FIG. 13 is a flowchart for describing an antenna switching method of an electronic device, according to an embodiment. For descriptive convenience, a description of an operation given with reference to FIGS. 11 and 12 will not be repeated here.

The flowchart illustrated in FIG. 13 may include operations that the electronic device 100 illustrated in FIG. 1 processes. Even though omitted below, the above description of the electronic device 100 given with reference to FIG. 1 may be applied to the method illustrated in FIG. 13.

According to an embodiment, the electronic device 100 may acquire information about a state of the electronic device 100. The electronic device 100 may determine whether a switching condition of an antenna is satisfied. The electronic device 100 may switch an antenna.

Referring to FIG. 13, in operation 1310, the electronic device 100 may verify a received signal strength indication (RSSI). For example, the electronic device 100 may verify an RSSI of a GPS signal through a communication circuit (e.g., the second communication circuit 122) included in the electronic device 100.

In operation 1320, the electronic device 100 may determine a level of the RSSI. For example, the electronic device 100 may determine whether the RSSI of the GPS signal is lower than a threshold value, through a processor (e.g., the processor 580 of FIG. 5) included in the electronic device 100.

If the determination result of operation 1320 indicates that the RSSI is lower than the threshold value, in operation 1330, the electronic device 100 may determine a state of the electronic device 100. For example, the electronic device 100 may determine whether a state of the electronic device 100 corresponds to a GPS priority situation, through the processor included in the electronic device 100. For example, in the case where an application using the GPS signal is executed, the electronic device 100 may determine that the state of the electronic device 100 corresponds to the GPS priority situation. For example, in the case where the electronic device 100 is busy or makes use of a wireless Internet, the electronic device 100 may determine that the state of the electronic device 100 does not correspond to the GPS priority situation. If the RSSI is higher than the threshold value, the electronic device 100 may again perform operation 1310.

If the determination result of operation 1330 indicates that the state of the electronic device 100 corresponds to the GPS priority situation, in operation 1340, the electronic device 100 may switch an antenna. For example, the electronic device 100 may periodically switch antenna through a control circuit (e.g., the control circuit 150) included in the electronic device 100. For example, the electronic device 100 may periodically control the switch 140 such that the second communication circuit 122 is alternately connected with the first conductive member 111 and the second conductive member 112 and a main signal processing block of the first communication circuit 121 is alternately connected with the first conductive member 111 and the second conductive member 112. If the state of the electronic device 100 does not correspond to the GPS priority situation, the electronic device 100 may again perform operation 1310.

Figure 14:
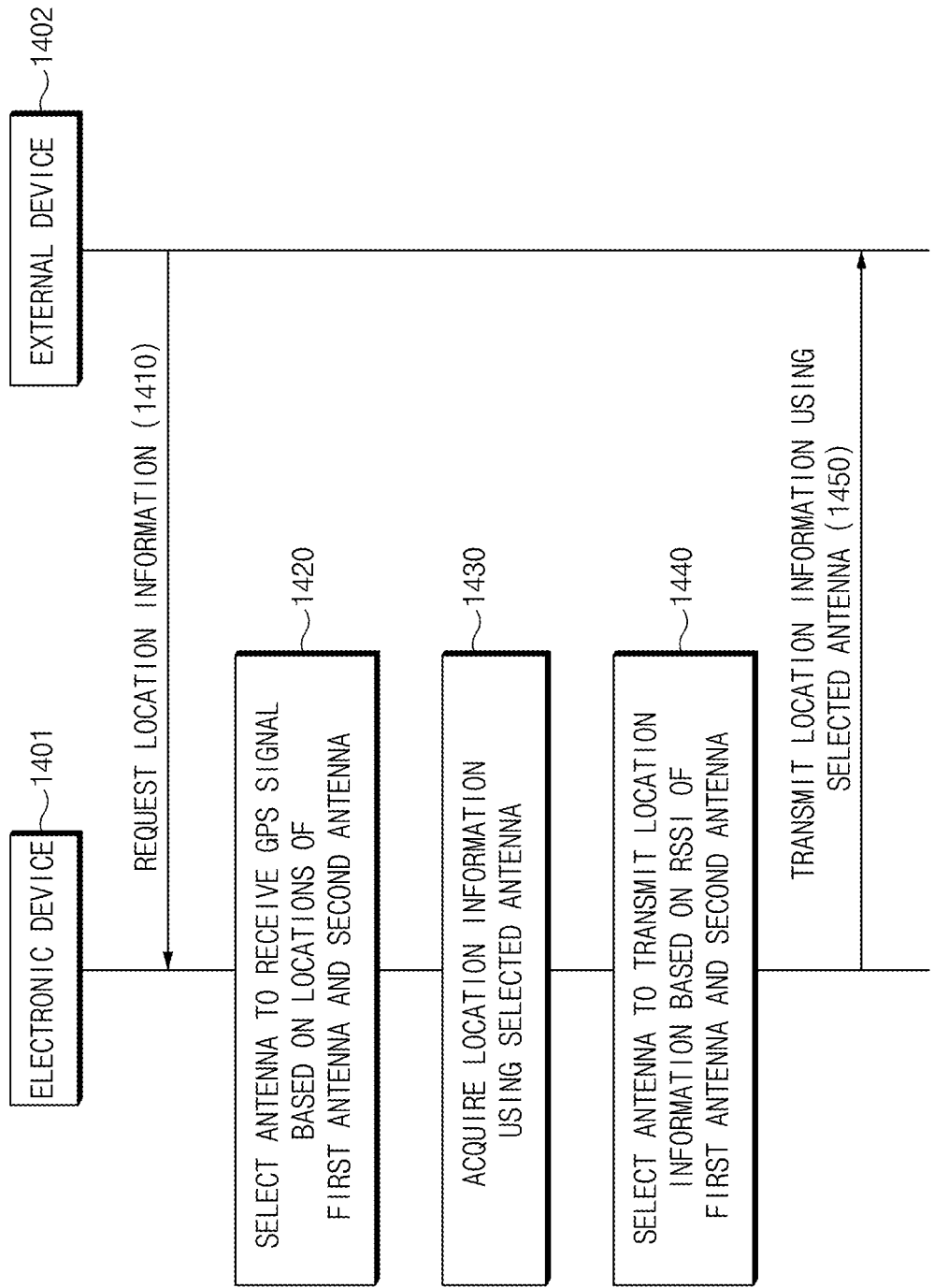
FIG. 14 is a flowchart for describing an antenna switching method of the electronic device, according to an embodiment.

FIG. 14 is a flowchart for describing an antenna switching method of an electronic device 1401, according to an embodiment. For example, the electronic device 1401 of FIG. 14 may be the electronic device 100 of FIG. 1. An external device 1402 of FIG. 14 may be a computing device that is capable of communicating with the electronic device 1401. For example, the external device 1402 may be a device, such as a terminal, a server, or the like, which collects location information of the electronic device 1401 in an emergency.

The flowchart illustrated in FIG. 14 may include operations that the electronic device 100 illustrated in FIG. 1 processes. Even though omitted below, the above description of the electronic device 1401 given with reference to FIG. 1 may be applied to the method illustrated in FIG. 14.

According to an embodiment, if location information of the electronic device 1401 is requested from the external device 1402, the electronic device 1401 may control at least one switching circuit such that the first communication circuit 121 and the second communication circuit 122 are connected with a conductive member, which is placed at the top, from among the first conductive member 111 or the second conductive member 112; if the location information is acquired, the electronic device 1401 may control at least one switching circuit such that the first communication circuit 121 and the second communication circuit 122 are connected with a conductive member, of which the RSSI is relatively high, from among the first conductive member 111 or the second conductive member 112.

Returning to FIG. 14, in operation 1410, the electronic device 1401 may receive a location information request. For example, the electronic device 1401 may receive the location information request from the external device 1402 through a communication circuit (e.g., the first communication circuit 121) included in the electronic device 1401. For example, the external device 1402 may request the electronic device 1401 of location information to acquire location information of the user for a rescue of the user in an emergency.

In operation 1420, the electronic device 1401 may select an antenna. For example, the electronic device 1401 may select an antenna to receive a GPS signal based on locations of a first antenna and a second antenna, through a processor (e.g., the processor 580 of FIG. 5) included in the electronic device 1401. For example, to improve receive sensitivity of a GPS signal, the electronic device 1401 may connect a conductive member, which is placed at the top, from among a first conductive member and a second conductive member with a second communication circuit in response to the request.

In operation 1430, the electronic device 1401 may acquire the location information. For example, the electronic device 1401 may acquire the location information using a communication circuit (e.g., the second communication circuit 122) included in the electronic device 1401 and the antenna selected in operation 1420. For example, the electronic device 1401 may receive the GPS signal through a conductive member, which is placed at the top, from among a first conductive member and a second conductive member.

In operation 1440, the electronic device 1401 may select an antenna. For example, the electronic device 1401 may be configured to select an antenna to transmit location information based on the RSSIs of the first antenna and the second antenna, through a control circuit (e.g., the control circuit 150) included in the electronic device 1401. For example, the electronic device 1401 may measure an RSSI associated with a cellular communication signal of the first conductive member and the second conductive member and may control a switching circuit such that a main signal processing block of the first communication circuit is connected with a conductive member of which the RSSI is high.

In operation 1450, the electronic device 1401 may transmit the location information. For example, the electronic device 1401 may transmit the location information using the communication circuit (e.g., the first communication circuit 121) included in the electronic device 1401 and the antenna selected in operation 1440. For example, the electronic device 1401 may transmit the acquired location information to the external device 1402 using a conductive member, of which the RSSI is high, from among the first conductive member and the second conductive member.

According to various embodiments, in the case where the electronic device 1401 receives the location information request from the external device 1402, the electronic device 1401 may receive a GPS signal and may transmit location information, using both the first conductive member and the second conductive member.

An electronic device according to an embodiment may include a housing including a first surface facing a first direction and a second surface facing a second direction opposite to the first direction, wherein the first surface includes a first side having a first length, a second side having a second length longer than the first length, a third side having the first length, and a fourth side having the second length, the first side is perpendicular to the second side and the fourth side and is parallel with the third side, a first conductive member extending along at least a part of the first side, a second conductive member extending along at least a part of the third side, a first wireless communication circuit including a transmission port and at least one first reception port, wherein the at least one first reception port is electrically coupled with at least one of the first conductive member or the second conductive member, a second wireless communication circuit including a second reception port, and a switching circuit configured to selectively provide a first electrical path for electrically coupling the transmission port and the second reception port with the first conductive member or a second electrical path for electrically coupling the transmission port and the second reception port with the second conductive member.

According to another embodiment, the first wireless communication circuit may be configured to provide wireless communication in a frequency range of 0.6 GHz to 2.7 GHz.

According to another embodiment, the second wireless communication circuit may be configured to provide wireless communication in a frequency range of 1170 MHz to 1580 MHz.

According to another embodiment, the second wireless communication circuit may be configured to receive a GPS signal.

According to another embodiment, the switching circuit may include a first switch and a second switch. The electronic device may further include a first extractor coupled with the first conductive member and the second switch, and a second extractor coupled with the second conductive member and the second switch. The second switch may be coupled with the second wireless communication circuit, and the first switch may be coupled with the first extractor, the second extractor, and the first wireless communication circuit.

According to another embodiment, the electronic device may further include an extractor including a first node coupled with the second wireless communication circuit, a second node coupled with the switching circuit, and a third node coupled with the first wireless communication circuit.

According to another embodiment, the switching circuit may include a first switch and a second switch. The electronic device may further include an extractor coupled between the first switch and the second switch. The second switch may be coupled between the first wireless communication circuit and the extractor, the second wireless communication circuit may be coupled with the extractor, and the first switch may be coupled with the first conductive member and the second conductive member.

According to another embodiment, the switching circuit may be s configured to selectively provide the first electrical path or the second electrical path such that the transmission port, the first reception port, or the second reception port is electrically coupled with the first conductive member or the second conductive member, based on at least one of a received signal strength indication of a signal received through the first conductive member or the second conductive member, an application executed in the electronic device and a grip state, acceleration, an angular velocity, a proximity state, or illuminance, which is measured by the electronic device.

According to another embodiment, the electronic device may further include a third conductive member extending along at least a part of the second side and adjacent to the first conductive member, and a fourth conductive member extending along at least a part of the fourth side and adjacent to the second conductive member. The first wireless communication circuit may be electrically coupled with the third conductive member and the fourth conductive member.

An electronic device according to an embodiment may include a first conductive member that receives signals of two or more bands from the outside, a second conductive member that is disposed to be spaced apart from the first conductive member and receives signals of the two or more bands from the outside, a first communication circuit that processes a signal, which corresponds to a first band, from among the signals of the two or more bands, a second communication circuit that processes a signal, which corresponds to a second band, from among the signals of the two or more bands, at least one extractor that extracts a signal, which corresponds to the second band, from among signals received through the first conductive member or the second conductive member and to transmit the signal of the second band to the second communication circuit, a switching circuit that is electrically connected with the at least one extractor and disposed on at least one of electrical paths between the first conductive member, the second conductive member, the first communication circuit, and the second communication circuit, and a control circuit that controls the at least one switching circuit based on a specified condition such that each of the first communication circuit and the second communication circuit is selectively connected with the first conductive member or the second conductive member.

According to another embodiment, the first communication circuit may include a main signal processing block and a diversity signal processing block. The control circuit may control the at least one switching circuit based on the specified condition such that one of the first conductive member or the second conductive member is connected with the main signal processing block and the other of the first conductive member or the second conductive member is connected with the diversity signal processing block.

According to another embodiment, the at least one extractor may include a first extractor and a second extractor. The at least one switching circuit may include a first switch and a second switch. The first switch may be disposed to connect the first communication circuit with the first conductive member through the first extractor or to connect the first communication circuit with the second conductive member through the second extractor. The second switch may be disposed to connect the second communication circuit with the first conductive member through the first extractor or to connect the second communication circuit with the second conductive member through the second extractor. The first extractor may be configured to, if the second communication circuit is connected with the first conductive member, transmit the signal of the second band from the first conductive member to the second communication circuit through the second switch. The second extractor may be configured to, if the second communication circuit is connected with the second conductive member, transmit the signal of the second band from the second conductive member to the second communication circuit through the second switch.

According to another embodiment, the at least one switching circuit may be disposed to connect one of the first conductive member or the second conductive member directly with the first communication circuit and to connect the other of the first conductive member or the second conductive member with the at least one extractor. The at least one extractor may be configured to transmit a signal, which corresponds to the second band, from among signals received through the at least one switching circuit to the second communication circuit.

According to another embodiment, the at least one switching circuit may include a first switch and a second switch. The first switch may be disposed to connect one of the first conductive member or the second conductive member directly with the second switch and to connect the other of the first conductive member or the second conductive member with the at least one extractor. The at least one extractor may be configured to transmit a signal, which corresponds to the second band, from among signals received through the first switch to the second communication circuit. The second switch may be disposed to connect with the at least one extractor and the first switch with the first wireless communication circuit.

According to another embodiment, the control circuit may control the at least one switching circuit based on a received signal strength indication (RSSI) of a signal received through the first conductive member or the second conductive member such that each of the first communication circuit and the second communication circuit is selectively connected with the first conductive member or the second conductive member.

According to another embodiment, the electronic device may further include a sensing module including at least one of a grip sensor, an acceleration sensor, an angular velocity sensor, a proximity sensor, or an illuminance sensor. The control circuit may control the at least one switching circuit based on at least one of a grip state, acceleration, an angular velocity, a proximity state, or illuminance measured by the sensing module such that each of the first communication circuit and the second communication circuit is selectively connected with the first conductive member or the second conductive member.

According to another embodiment, the control circuit may control the at least one switching circuit such that the first communication circuit is connected with a conductive member, of which an RSSI is relatively high, from among the first conductive member and the second conductive member and the second communication circuit is connected with a conductive member, which is placed at the top, from among the first conductive member or the second conductive member.

According to another embodiment, the control circuit may control, if an application associated with the signal of the second band is executed in the electronic device, the at least one switching circuit such that the first communication circuit and the second communication circuit are connected with a conductive member, which is placed at the top, from among the first conductive member or the second conductive member.

According to another embodiment, the control circuit may control, if location information of the electronic device is requested from an external device, the at least one switching circuit such that the first communication circuit and the second communication circuit are connected with a conductive member, which is placed at the top, from among the first conductive member or the second conductive member and may control, if the location information is acquired, the at least one switching circuit such that the first communication circuit and the second communication circuit are connected with a conductive member, of which a received signal strength indication is relatively high, from among the first conductive member or the second conductive member.

According to an embodiment, an antenna switching method of an electronic device which includes a first conductive member, a second conductive member, a first wireless communication circuit, a second wireless communication circuit, and at least one switching circuit, may include acquiring state information of the electronic device, controlling the at least one switching circuit based on the state information such that each of the first wireless communication circuit and the second wireless communication circuit is electrically coupled with the first conductive member or the second conductive member capable of receiving a signal of a first band and a signal of a second band from the outside, and receiving the signal of the first band from a conductive member connected with the first wireless communication circuit using the first wireless communication circuit and receiving the signal of the second band from a conductive member connected with the second wireless communication circuit using the second wireless communication circuit.

Figure 15:
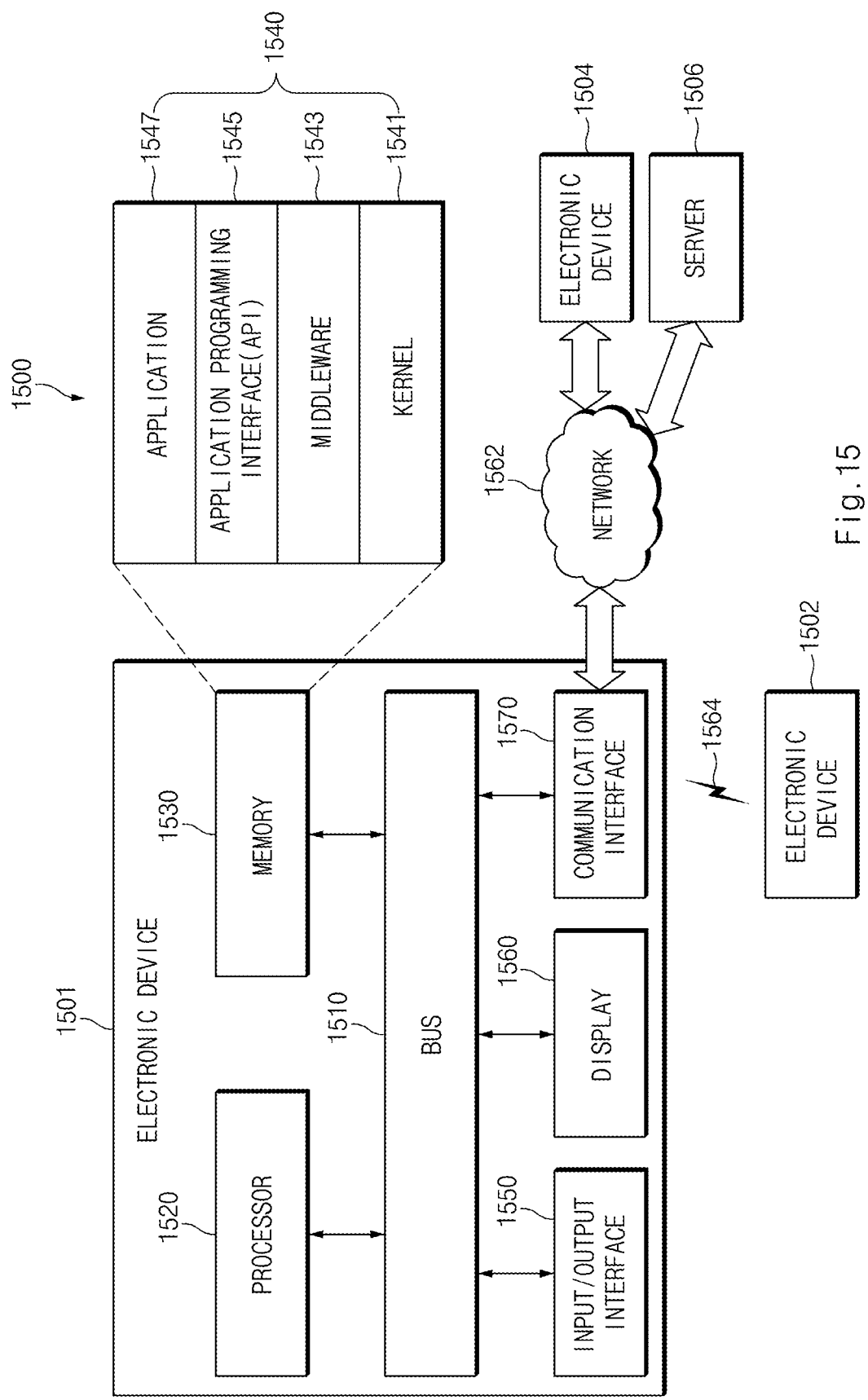
FIG. 15 illustrates a network environment system, according to various embodiments.

FIG. 15 is a diagram illustrating a network environment system, according to various embodiments.

Referring to FIG. 15, according to various embodiments, an electronic device 1501 in a network environment 1500 is described. The electronic device 1501 may include a bus 1510, a processor 1520, a memory 1530, an input/output interface 1550, a display 1560, and a communication interface 1570. According to an embodiment, the electronic device 1501 may not include at least one of the above-described elements or may further include other element(s).

For example, the bus 1510 may interconnect the above-described elements 1510 to 1570 and may include a circuit for conveying communications (e.g., a control message and/or data) among the above-described elements.

The processor 1520 may include one or more of a central processing unit (CPU), an application processor (AP), or a communication processor (CP). For example, the processor

1520 may perform an arithmetic operation or data processing associated with control and/or communication of at least other elements of the electronic device 1501.

The memory 1530 may include a volatile and/or nonvolatile memory. For example, the memory 1530 may store instructions or data associated with at least one other element(s) of the electronic device 1501. According to an embodiment, the memory 1530 may store software and/or a program 1540. The program 1540 may include, for example, a kernel 1541, a middleware 1543, an application programming interface (API) 1545, and/or an application program (or "an application") 1547. At least a part of the kernel 1541, the middleware 1543, or the API 1545 may be called an "operating system (OS)".

For example, the kernel 1541 may control or manage system resources (e.g., the bus 1510, the processor 1520, the memory 1530, and the like) that are used to execute operations or functions of other programs (e.g., the middleware 1543, the API 1545, and the application program 1547). Furthermore, the kernel 1541 may provide an interface that allows the middleware 1543, the API 1545, or the application program 1547 to access discrete elements of the electronic device 1501 so as to control or manage system resources.

The middleware 1543 may perform a mediation role such that the API 1545 or the application program 1547 communicates with the kernel 1541 to exchange data.

Furthermore, the middleware 1543 may process task requests received from the application program 1547 according to a priority. For example, the middleware 1543 may assign the priority, which makes it possible to use a system resource (e.g., the bus 1510, the processor 1520, the memory 1530, or the like) of the electronic device 1501, to at least one of the application program 1547. For example, the middleware 1543 may process the one or more task requests according to the priority assigned to the at least one, which makes it possible to perform scheduling or load balancing on the one or more task requests.

The API 1545 may be, for example, an interface through which the application program 1547 controls a function provided by the kernel 1541 or the middleware 1543, and may include, for example, at least one interface or function (e.g., an instruction) for a file control, a window control, image processing, a character control, or the like.

The input/output interface 1550 may play a role, for example, an interface which transmits an instruction or data input from a user or another external device, to other element(s) of the electronic device 1501. Furthermore, the input/output interface 1550 may output an instruction or data, received from other element(s) of the electronic device 1501, to a user or another external device.

The display 1560 may include, for example, a liquid crystal display (LCD), a light-emitting diode (LED) display, an organic LED (OLED) display, a microelectromechanical systems (MEMS) display, or an electronic paper display. The display 1560 may display, for example, various contents (e.g., a text, an image, a video, an icon, a symbol, and the like) to a user. The display 1560 may include a touch screen and may receive, for example, a touch, gesture, proximity, or hovering input using an electronic pen or a part of a user's body.

For example, the communication interface 1570 may establish communication between the electronic device 1501 and an external device (e.g., the first external electronic device 1502, the second external electronic device 1504, or the server 1506). For example, the communication interface 1570 may be connected to the network 1562 over wireless communication or wired communication to communicate with the external device (e.g., the second external electronic device 1504 or the server 1506).

The wireless communication may use at least one of, for example, LTE (long-term evolution), LTE-A (LTE Advanced), CDMA (Code Division Multiple Access), WCDMA (Wideband CDMA), UMTS (Universal Mobile Telecommunications System), WiBro (Wireless Broadband), GSM (Global System for Mobile Communications), or the like. Furthermore, the wireless communication may include, for example, the short range communication 1564. The short range communication 1564 may include at least one of a wireless fidelity (Wi-Fi), a Bluetooth, a near field communication (NFC), a magnetic stripe transmission (MST), a global navigation satellite system (GNSS), or the like. The GNSS may include at least one of, for example, a global positioning system (GPS), a global navigation satellite system (Glonass), a Beidou navigation satellite system (hereinafter referred to as "Beidou"), or an European global satellite-based navigation system (hereinafter referred to as "Galileo") based on an available region, a bandwidth, or the like. Hereinafter, in the present disclosure, "GPS" and "GNSS" may be interchangeably used. The wired communication may include at least one of, for example, a universal serial bus (USB), a high definition multimedia interface (HDMI), a recommended standard-232 (RS-232), a plain old telephone service (POTS), or the like. The network 1562 may include at least one of telecommunications networks, for example, a computer network (e.g., LAN or WAN), an Internet, or a telephone network.

Each of the first and second external electronic devices 1502 and 1504 may be a device of which the type is different from or the same as that of the electronic device 1501. According to an embodiment, the server 1506 may include a group of one or more servers. According to various embodiments, all or a portion of operations that the electronic device 1501 will perform may be executed by another or plural electronic devices (e.g., the electronic devices 1502 and 1504 or the server 1506). According to an embodiment, in the case where the electronic device 1501 executes any function or service automatically or in response to a request, the electronic device 1501 may not perform the function or the service internally, but, alternatively additionally, it may request at least a portion of a function associated with the electronic device 1501 at other device (e.g., the electronic device 1502 or 1504 or the server 1506). The other electronic device (e.g., the electronic device 1502 or 1504 or the server 1506) may execute the requested function or additional function and may transmit the execution result to the electronic device 1501. The electronic device 1501 may provide the requested function or service using the received result or may additionally process the received result to provide the requested function or service. To this end, for example, cloud computing, distributed computing, or client-server computing may be used.

Figure 16:
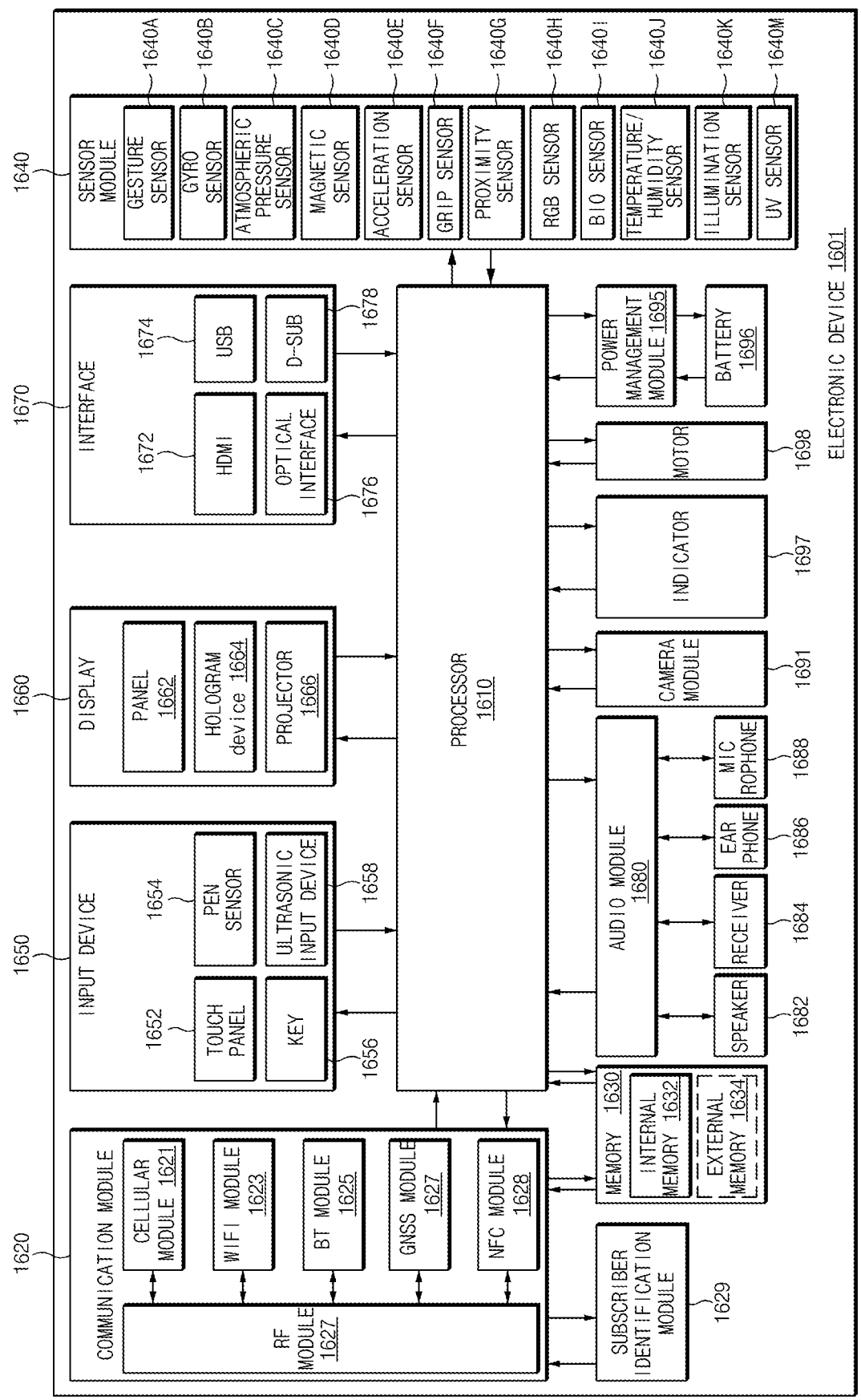
FIG. 16 illustrates a block diagram of the electronic device, according to various embodiments.

FIG. 16 illustrates a block diagram of an electronic device, according to various embodiments.

An electronic device 1601 may include, for example, all or a part of the electronic device 1501 illustrated in FIG. 15. The electronic device 1601 may include one or more processors (e.g., an application processor) 1610, a communication module 1620, a subscriber identification module 1629, a memory 1630, a sensor module 1640, an input device 1650, a display 1660, an interface 1670, an audio module 1680, a camera module 1691, a power management module 1695, a battery 1696, an indicator 1697, and a motor 1698. The processor 1610 may drive, for example, an operating system (OS) or an application to control a plurality of hardware or software elements connected to the processor 1610 and may process and compute a variety of data. For example, the processor 1610 may be implemented with a System on Chip (SoC). According to an embodiment, the processor 1610 may further include a graphic processing unit (GPU) and/or an image signal processor. The processor 1610 may include at least a part (e.g., a cellular module 1621) of elements illustrated in FIG. 16. The processor 1610 may load and process an instruction or data, which is received from at least one of other elements (e.g., a nonvolatile memory) and may store a variety of data in a nonvolatile memory.

The communication module 1620 may be configured the same as or similar to the communication interface 1570. The communication module 1620 may include the cellular module 1621, a Wi-Fi module 1622, a Bluetooth (BT) module 1623, a GNSS module 1624, a near field communication (NFC) module 1625, and a radio frequency (RF) module 1627. The cellular module 1621 may provide, for example, voice communication, video communication, a character service, an Internet service, or the like over a communication network. According to an embodiment, the cellular module 1621 may perform discrimination and authentication of the electronic device 1601 within a communication network using the subscriber identification module (e.g., a SIM card) 1629. According to an embodiment, the cellular module 1621 may perform at least a portion of functions that the processor 1610 provides. According to an embodiment, the cellular module 1621 may include a communication processor (CP). According to an embodiment, at least a part (e.g., two or more) of the cellular module 1621, the Wi-Fi module 1622, the BT module 1623, the GNSS module 1624, or the NFC module 1625 may be included within one Integrated Circuit (IC) or an IC package. For example, the RF module 1627 may transmit and receive a communication signal (e.g., an RF signal). For example, the RF module 1627 may include a transceiver, a power amplifier module (PAM), a frequency filter, a low noise amplifier (LNA), an antenna, or the like. According to another embodiment, at least one of the cellular module 1621, the Wi-Fi module 1622, the BT module 1623, the GNSS module 1624, or the NFC module 1625 may transmit and receive an RF signal through a separate RF module. The subscriber identification module 1629 may include, for example, a card and/or embedded SIM that includes a subscriber identification module and may include unique identify information (e.g., integrated circuit card identifier (ICCID)) or subscriber information (e.g., integrated mobile subscriber identity (IMSI)).

The memory 1630 (e.g., the memory 1530) may include an internal memory 1632 or an external memory 1634. For example, the internal memory 1632 may include at least one of a volatile memory (e.g., a dynamic random access memory (DRAM), a static RAM (SRAM), or a synchronous DRAM (SDRAM)), a nonvolatile memory (e.g., a one-time programmable read only memory (OTPROM), a programmable ROM (PROM), an erasable and programmable ROM (EPROM), an electrically erasable and programmable ROM (EEPROM), a mask ROM, a flash ROM, a flash memory (e.g., a NAND flash memory or a NOR flash memory)), a hard drive, or a solid state drive (SSD). The external memory 1634 may include a flash drive such as compact flash (CF), secure digital (SD), micro secure digital (Micro-SD), mini secure digital (Mini-SD), extreme digital (xD), a multimedia card (MMC), a memory stick, or the like. The external memory 1634 may be operatively and/or physically connected to the electronic device 1601 through various interfaces.

The sensor module 1640 may measure, for example, a physical quantity or may detect an operation state of the electronic device 1601. The sensor module 1640 may convert the measured or detected information to an electric signal. Generally or additionally, the sensor module 1640 may include at least one of a gesture sensor 1640A, an angular velocity sensor 1640B, a barometric pressure sensor 1640C, a magnetic sensor 1640D, an acceleration sensor 1640E, a grip sensor 1640F, the proximity sensor 1640G, a color sensor 1640H (e.g., red, green, blue (RGB) sensor), a biometric sensor 1640I, a temperature/humidity sensor 1640J, an illuminance sensor 1640K, or an UV sensor 1640M. Although not illustrated, additionally or generally, the sensor module 1640 may further include, for example, an E-nose sensor, an electromyography sensor (EMG) sensor, an electroencephalogram (EEG) sensor, an electrocardiogram (ECG) sensor, an infrared (IR) sensor, an iris sensor, a fingerprint sensor, and the like. The sensor module 1640 may further include a control circuit for controlling at least one or more sensors included therein. According to an embodiment, the electronic device 1601 may further include a processor that is a part of the processor 1610 or independent of the processor 1610 and is configured to control the sensor module 1640. The processor may control the sensor module 1640 while the processor 1610 remains at a sleep state.

The input device 1650 may include, for example, a touch panel 1652, a (digital) pen sensor 1654, a key 1656, or an ultrasonic input unit 1658. For example, the touch panel 1652 may use at least one of capacitive, resistive, infrared and ultrasonic detecting methods. Also, the touch panel 1652 may further include a control circuit. The touch panel 1652 may further include a tactile layer to provide a tactile reaction to a user. The (digital) pen sensor 1654 may be, for example, a part of a touch panel or may include an additional sheet for recognition. The key 1656 may include, for example, a physical button, an optical key, a keypad, or the like. The ultrasonic input device 1658 may detect (or sense) an ultrasonic signal, which is generated from an input device, through a microphone (e.g., a microphone 1688) and may check data corresponding to the detected ultrasonic signal.

The display 1660 (e.g., the display 1560) may include a panel 1662, a hologram device 1664, or a projector 1666. The panel 1662 may be the same as or similar to the display 1560 illustrated in FIG. 15. The panel 1662 may be implemented, for example, to be flexible, transparent or wearable. The panel 1662 and the touch panel 1652 may be integrated into a single module. The hologram device 1664 may display a stereoscopic image in a space using a light interference phenomenon. The projector 1666 may project light onto a screen so as to display an image. The screen may be arranged in the inside or the outside of the electronic device 1601. According to an embodiment, the display 1660 may further include a control circuit for controlling the panel 1662, the hologram device 1664, or the projector 1666.

The interface 1670 may include, for example, a high-definition multimedia interface (HDMI) 1672, a universal serial bus (USB) 1674, an optical interface 1676, or a D-subminiature (D-sub) 1678. The interface 1670 may be included, for example, in the communication interface 1570 illustrated in FIG. 15. Additionally or generally, the interface 1670 may include, for example, a mobile high definition link (MHL) interface, a SD card/multi-media card (MMC) interface, or an infrared data association (IrDA) standard interface.

The audio module 1680 may convert a sound and an electric signal in dual directions. At least a part of the audio module 1680 may be included, for example, in the input/output interface 1550 illustrated in FIG. 15. The audio module 1680 may process, for example, sound information that is input or output through a speaker 1682, a receiver 1684, an earphone 1686, or the microphone 1688. The camera module 1691 for shooting a still image or a video may include, for example, at least one or more image sensors (e.g., a front sensor or a rear sensor), a lens, an image signal processor (ISP), or a flash (e.g., an LED or a xenon lamp). The power management module 1695 may manage, for example, power of the electronic device 1601. According to an embodiment, a power management integrated circuit (PMIC), a charger IC, or a battery or fuel gauge may be included in the power management module 1695. The PMIC may have a wired charging method and/or a wireless charging method. The wireless charging method may include, for example, a magnetic resonance method, a magnetic induction method or an electromagnetic method and may further include an additional circuit, for example, a coil loop, a resonant circuit, or a rectifier, and the like. The battery gauge may measure, for example, a remaining capacity of the battery 1696 and a voltage, current or temperature thereof while the battery is charged. The battery 1696 may include, for example, a rechargeable battery and/or a solar battery.

The indicator 1697 may display a specific state of the electronic device 1601 or a part thereof (e.g., the processor 1610), such as a booting state, a message state, a charging state, and the like. The motor 1698 may convert an electrical signal into a mechanical vibration and may generate the following effects: vibration, haptic, and the like. A processing device (e.g., a GPU) for supporting a mobile TV may be included in the electronic device 1601. The processing device for supporting the mobile TV may process media data according to the standards of digital multimedia broadcasting (DMB), digital video broadcasting (DVB), MediaFlo™, or the like. Each of the above-mentioned elements of the electronic device according to various embodiments of the present disclosure may be configured with one or more components, and the names of the elements may be changed according to the type of the electronic device. In various embodiments, the electronic device (e.g., the electronic device 1601) may omit some elements or may further include additional elements. Furthermore, some of the elements of the electronic device may be combined with each other so as to form one entity, so that the functions of the elements may be performed in the same manner as before the combination.

Each of the above-mentioned elements of the electronic device according to various embodiments of the present disclosure may be configured with one or more components, and the names of the elements may be changed according to the type of the electronic device. In various embodiments, the electronic device may include at least one of the above-mentioned elements, and some elements may be omitted or other additional elements may be added. Furthermore, some of the elements of the electronic device according to various embodiments may be combined with each other so as to form one entity, so that the functions of the elements may be performed in the same manner as before the combination.

Figure 17:
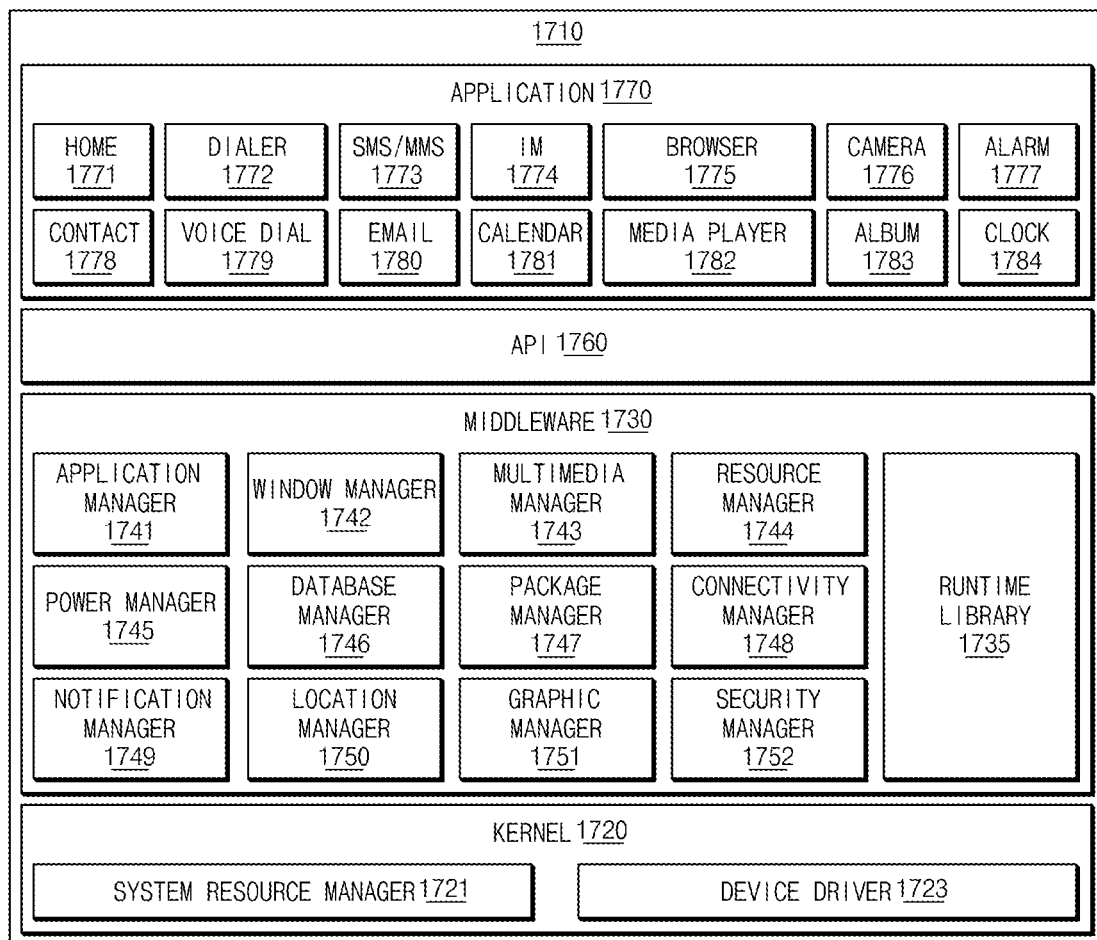
FIG. 17 illustrates a block diagram of a program module, according to various embodiments.

FIG. 17 illustrates a block diagram of a program module, according to various embodiments. According to an embodiment, a program module 1710 (e.g., the program 1540) may include an operating system (OS) to control resources associated with an electronic device (e.g., the electronic device 1501), and/or diverse applications (e.g., the application program 1547) driven on the OS. The OS may be, for example, Android, iOS, Windows, Symbian, Tizen, or Samsung bada OS.

The program module 1710 may include a kernel 1720, a middleware 1730, an application programming interface (API) 1760, and/or an application 1770. At least a portion of the program module 1710 may be preloaded on an electronic device or may be downloadable from an external electronic device (e.g., the electronic device 1502 or 1504, the server 1506, and the like).

The kernel 1720 (e.g., the kernel 1541) may include, for example, a system resource manager 1721 or a device driver 1723. The system resource manager 1721 may perform control, allocation, or retrieval of system resources. According to an embodiment, the system resource manager 1721 may include a process managing unit, a memory managing unit, or a file system managing unit. The device driver 1723 may include, for example, a display driver, a camera driver, a Bluetooth driver, a shared memory driver, a USB driver, a keypad driver, a Wi-Fi driver, an audio driver, or an inter-process communication (IPC) driver.

As an embodiment of various embodiments, a display driver may control at least one or more displayer driver ICs (DDI). The display driver may include functions for controlling a screen according to a request from the application 1770.

The middleware 1730 may provide, for example, a function that the application 1770 needs in common, or may provide diverse functions to the application 1770 through the API 1760 to allow the application 1770 to efficiently use limited system resources of the electronic device. According to an embodiment, the middleware 1730 (e.g., the middleware 1543) may include at least one of a runtime library 1735, an application manager 1741, a window manager 1742, a multimedia manager 1743, a resource manager 1744, a power manager 1745, a database manager 1746, a package manager 1747, a connectivity manager 1748, a notification manager 1749, a location manager 1750, a graphic manager 1751, or a security manager 1752.

The runtime library 1735 may include, for example, a library module that is used by a compiler to add a new function through a programming language while the application 1770 is being executed. The runtime library 1735 may perform input/output management, memory management, or capacities about arithmetic functions.

The application manager 1741 may manage, for example, a life cycle of at least one application of the application 1770. The window manager 1742 may manage a GUI resource that is used in a screen. For example, in the case where two or more displays 1660 are connected each other, the window manager 1742 may configure or manage the screen in several ways based on a screen ratio or an operation of the application 1770. The multimedia manager 1743 may identify a format necessary for playing diverse media files, and may perform encoding or decoding of media files using a codec suitable for the format. The resource manager 1744 may manage resources such as a storage space, memory, or source code of at least one application of the application 1770.

The power manager 1745 may operate, for example, with a basic input/output system (BIOS) to manage a battery or power, and may provide power information for an operation of an electronic device. The database manager 1746 may generate, search for, or modify database that is to be used in at least one application of the application 1770. The package manager 1747 may install or update an application that is distributed in the form of package file.

The connectivity manager 1748 may manage, for example, wireless connection such as Wi-Fi or Bluetooth. The notification manager 1749 may display or notify an event such as arrival message, appointment, or proximity notification in a mode that does not disturb a user. The location manager 1750 may manage location information about an electronic device. The graphic manager 1751 may manage a graphic effect that is provided to a user, or manage a user interface relevant thereto. The security manager 1752 may provide a general security function necessary for system security or user authentication. According to an embodiment, in the case where an electronic device (e.g., the electronic device 1501) includes a telephony function, the middleware 1730 may further includes a telephony manager for managing a voice or video call function of the electronic device.

The middleware 1730 may include a middleware module that combines diverse functions of the above-described elements. The middleware 1730 may provide a module specialized to each OS kind to provide differentiated functions. Additionally, the middleware 1730 may dynamically remove a part of the preexisting elements or may add new elements thereto.

The API 1760 (e.g., the API 1545) may be, for example, a set of programming functions and may be provided with a configuration that is variable depending on an OS. For example, in the case where an OS is the android or the iOS, it may be permissible to provide one API set per platform. In the case where an OS is the tizen, it may be permissible to provide two or more API sets per platform.

The application 1770 (e.g., the application program 1547) may include, for example, one or more applications capable of providing functions for a home 1771, a dialer 1772, an SMS/MMS 1773, an instant message (IM) 1774, a browser 1775, a camera 1776, an alarm 1777, a contact 1778, a voice dial 1779, an e-mail 1780, a calendar 1781, a media player 1782, an album 1783, and a timepiece 1784, or for offering health care (e.g., measuring an exercise quantity, blood sugar, or the like) or environment information (e.g., atmospheric pressure, humidity, temperature, or the like).

According to an embodiment, the application 1770 may include an application (hereinafter referred to as "information exchanging application" for descriptive convenience) to support information exchange between an electronic device (e.g., the electronic device 1501) and an external electronic device (e.g., the electronic device 1502 or 1504). The information exchanging application may include, for example, a notification relay application for transmitting specific information to an external electronic device, or a device management application for managing the external electronic device.

For example, the notification relay application may include a function of transmitting notification information, which arise from other applications (e.g., applications for SMS/MMS, e-mail, health care, or environmental information), to an external electronic device (e.g., the electronic device 1502 or 1504). Additionally, the information exchanging application may receive, for example, notification information from an external electronic device and provide the notification information to a user.

The device management application may manage (e.g., install, delete, or update), for example, at least one function (e.g., turn-on/turn-off of an external electronic device itself (or a part of elements) or adjustment of brightness (or resolution) of a display) of the external electronic device (e.g., the electronic device 1502 or 1504) which communicates with the electronic device, an application running in the external electronic device, or a service (e.g., a call service, a message service, or the like) provided from the external electronic device.

According to an embodiment, the application 1770 may include an application (e.g., a health care application of a mobile medical device) that is assigned in accordance with an attribute of an external electronic device (e.g., the electronic device 1502 or 1504). According to an embodiment, the application 1770 may include an application that is received from an external electronic device (e.g., the server 1506 or the electronic device 1502 or 1504). According to an embodiment, the application 1770 may include a preloaded application or a third party application that is downloadable from a server. The element titles of the program module 1710 according to the embodiment may be modifiable depending on kinds of operating systems.

According to various embodiments, at least a portion of the program module 1710 may be implemented by software, firmware, hardware, or a combination of two or more thereof. At least a portion of the program module 1710 may be implemented (e.g., executed), for example, by the processor (e.g., the processor 1610). At least a portion of the program module 1710 may include, for example, modules, programs, routines, sets of instructions, processes, or the like for performing one or more functions.

The term "module" used herein may represent, for example, a unit including one or more combinations of hardware, software and firmware. The term "module" may be interchangeably used with the terms "unit", "logic", "logical block", "component" and "circuit". The "module" may be a minimum unit of an integrated component or may be a part thereof. The "module" may be a minimum unit for performing one or more functions or a part thereof. The "module" may be implemented mechanically or electronically. For example, the "module" may include at least one of an application-specific IC (ASIC) chip, a field-programmable gate array (FPGA), and a programmable-logic device for performing some operations, which are known or will be developed.

At least a part of an apparatus (e.g., modules or functions thereof) or a method (e.g., operations) according to various embodiments may be, for example, implemented by instructions stored in a computer-readable storage media in the form of a program module. The instruction, when executed by a processor (e.g., the processor 1520), may cause the one or more processors to perform a function corresponding to the instruction. The computer-readable storage media, for example, may be the memory 1530.

A computer-readable recording medium may include a hard disk, a floppy disk, a magnetic media (e.g., a magnetic tape), an optical media (e.g., a compact disc read only memory (CD-ROM) and a digital versatile disc (DVD), a magneto-optical media (e.g., a floptical disk)), and hardware devices (e.g., a read only memory (ROM), a random access memory (RAM), or a flash memory). Also, a program instruction may include not only a mechanical code such as things generated by a compiler but also a high-level language code executable on a computer using an interpreter. The above hardware unit may be configured to operate via one or more software modules for performing an operation of the present disclosure, and vice versa.

A module or a program module according to various embodiments may include at least one of the above elements, or a part of the above elements may be omitted, or additional other elements may be further included. Operations performed by a module, a program module, or other elements according to various embodiments may be executed sequentially, in parallel, repeatedly, or in a heuristic method. In addition, some operations may be executed in different sequences or may be omitted. Alternatively, other operations may be added.

Figure 18:
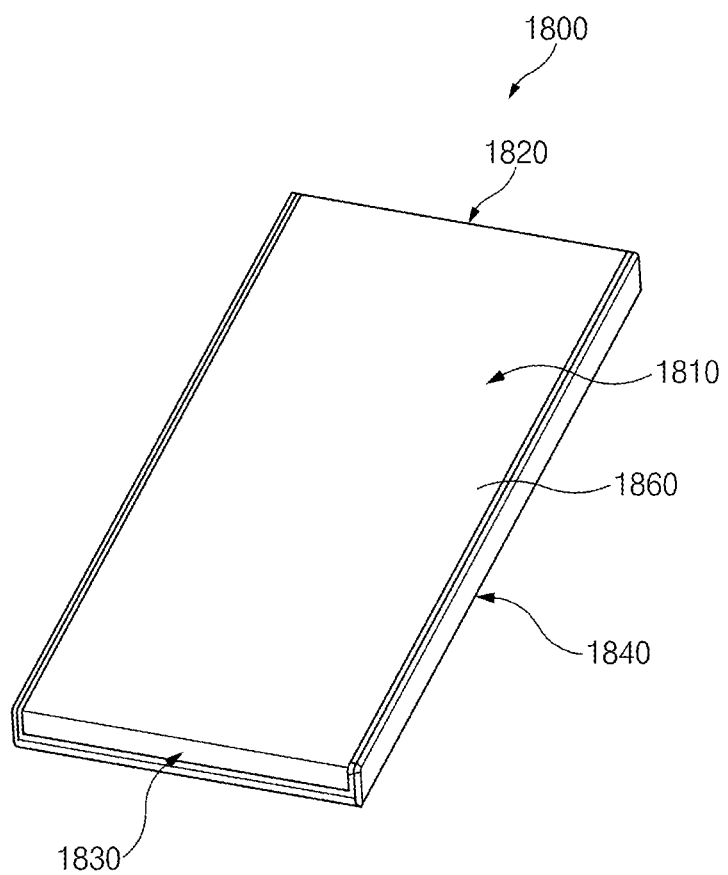
FIG. 18 illustrates a perspective view of the electronic device, according to various embodiments.

FIG. 18 illustrates a perspective view of an electronic device, according to various embodiments. For example, an electronic device 1800 may be the electronic device 1501 illustrated in FIG. 15.

As illustrated in FIG. 18, the electronic device 1800 may include a first surface 1810, a second surface 1820, a third surface 1830, and a fourth surface 1840. The first surface 1810 may be a front surface of the electronic device 1800. Each of the second surface 1820 and the third surface 1830 may be one side surface of the electronic device 1800. Each of the second surface 1820 and the third surface 1830 may be any one surface formed between the first surface 1810 and the fourth surface 1840. Each of the second surface 1820 and the third surface 1830 is illustrated in FIG. 18 as being a side surface of the electronic device 1800 of which a length is relatively short. However, embodiments may not be limited thereto. For example, each of the second surface 1820 and the third surface 1830 may be a side surface of the electronic device 1800 of which a length is relatively long. The fourth surface 1840 may be a rear surface of the electronic device 1800.

According to an embodiment, a display 1860 may be, for example, the display 1560 of FIG. 15. The display 1860 may be disposed on at least any one of the first surface 1810, the second surface 1820, the third surface 1830, and the fourth surface 1840 in the electronic device 1800. According to an embodiment, the display 1860 may be disposed on the first surface 1810, the second surface 1820, and the third surface 1830 in the electronic device 1800. One display 1860 may be disposed on the entirety of the first surface 1810. The display 1860 may be disposed on the entire surface by removing a hole for a structure or a physical button. The display 1860 may be disposed to extend to the second surface 1820 and the third surface 1830 on the first surface 1810. According to an embodiment, one flexible display 1860 may be bent in the second surface 1820 and the third surface 1820. According to an embodiment, the electronic device 1800 may include the display 1860 in which an area in which a screen is not displayed is not completely removed. For example, the electronic device 1800 may include a BM area in which a width of a part of the area, in which a screen is not displayed, is 0.1 to 1 mm and a width of at least another part thereof is 1 mm to 5 mm.

Figure 19:
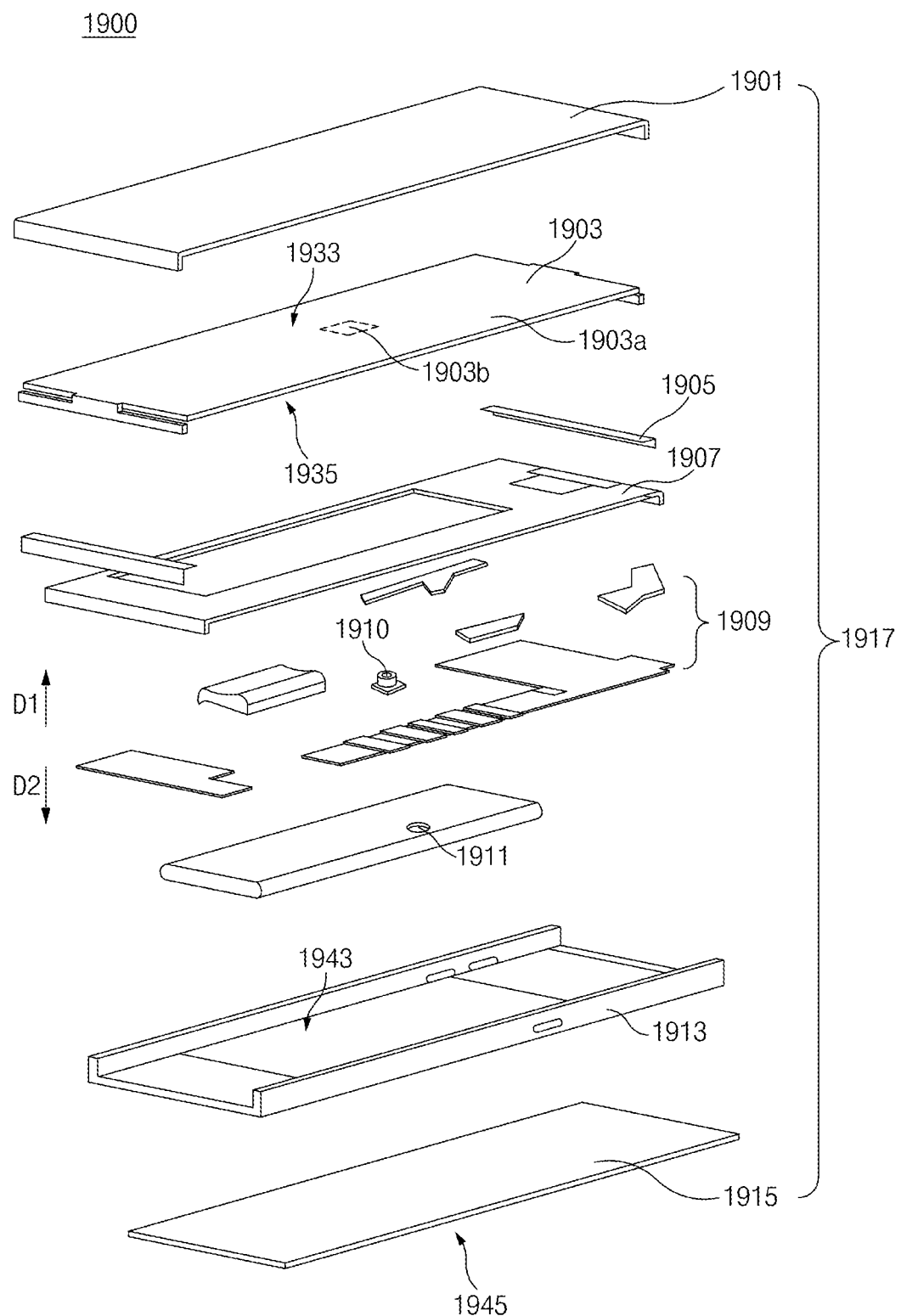
FIG. 19 illustrates an exploded perspective view of the electronic device, according to various embodiments.

FIG. 19 illustrates an exploded perspective view of an electronic device, according to various embodiments. For example, an electronic device 1900 may be the electronic device 1501 illustrated in FIG. 15.

As illustrated in FIG. 19, the electronic device 1900 according to various embodiments may include a transparent plate 1901, a display 1903, a flexible printed circuit board (FPCB) 1905, a bracket 1907, a panel board assembly (PBA) 1909, a battery 1911, a camera device 1910, and a housing 1917.

According to an embodiment, the transparent plate 1901 may be disposed on the electronic device 1900. The transparent plate 1901 may protect various configurations disposed under the transparent plate 1901. The transparent plate 1901 may allow internal light generated in the electronic device 1900 to be output to the outside. Also, the transparent plate 1901 may pass external light incident from the outside of the electronic device 1900 into the interior of the electronic device 1900. The transparent plate 1901 may be formed of a material that is excellent in light transmittance, a heat-resistant property, a chemically resistant property, mechanical strength, and the like. Here, the transparent plate 1901 may be, for example, a transparent film formed of polyethyleneterephthalate or a glass substrate or may be a plastic substrate formed of polymethylmethacrylate, polyamide, polyimide, polypropylene, polyurethane, or the like.

According to various embodiments, the transparent plate 1901 may further include a touch panel that senses a touch on a surface of the transparent plate 1901. The touch panel may correspond to the touch panel 1652 described with reference to FIG. 16. The touch panel 1652 may sense a touch, for example, using at least one of capacitive, resistive, infrared, and ultrasonic detecting methods.

Meanwhile, the transparent plate 1901 may be disposed on an upper portion of the electronic device 1900 to protect internal configurations. Thus, the transparent plate 1901 may constitute a part of the housing 1917.

According to an embodiment, the housing 1917 may include a first surface 1943 and a second surface 1945. The first surface 1943 may be a surface facing a first direction D1. The second surface 1945 may be a surface facing a second direction D2 opposite to the first direction D1. The transparent plate 1901 may constitute at least a part of the first surface 1943 of the housing 1917. That is, the transparent plate 1901 may constitute a part of the housing 1917.

According to an embodiment, the display 1903 may be a component corresponding to the display 1560 described with reference to FIG. 15. The display 1903 may be disposed between the transparent plate 1901 and the second surface 1945 of the housing 1917. The display 1903 may include a first surface 1933 facing the first direction D1 and a second surface 1935 facing the second direction D2. The display that is an internal component of the electronic device 1900 may perform an actual operation in the electronic device 1900. The display 1903 may perform a function of displaying an image.

According to an embodiment, the display 1903 may include a first area 1903a and a second area 1903b. When viewed from the top, the first area 1903a may be an area of which at least a part does not overlap with at least one sensor. When viewed from the top, the second area 1903b may be an area of which at least a part overlaps with at least one sensor. In various embodiments, the second area 1903b may be a central area in the display 1903. That is, the camera device 1910 may be disposed at the center in the electronic device 1900. Meanwhile, a sensor is illustrated in FIG. 19 as being the camera device 1910. However, embodiments may not be limited thereto. For example, as well as the camera device 1910, various sensors such as a proximity sensor, an illuminance sensor, a fingerprint recognition sensor, a biometric sensor, and the like, may be disposed.

According to an embodiment, the flexible printed circuit board 1905 may be electrically connected with various components including the display 1903. The flexible printed circuit board 1905 may apply a signal to the display 1903 or may receive a signal from the display 1903. The bracket 1907 may fix the panel board assembly 1909 and the battery 1911. The panel board assembly 1909 may include a printed circuit board (PCB) and a connector. The panel board assembly 1909 may be electrically connected with various components including the display 1903. The battery 1911 may manage power of the electronic device 1900. The display 1911 may be a component corresponding to the battery 1696 described with reference to FIG. 16.

According to an embodiment, the housing 1917 may include the transparent plate 1901, a frame mold 1913, and a back cover 1915. The frame mold 1913 may fix an internal configuration of the electronic device 1900. The frame mold 1913 may accommodate and fix the display 1903, the flexible printed circuit board 1905, the bracket 1907, the panel board assembly 1909, and the battery 1911. The frame mold 1913 may be implemented to protect an internal configuration of the display 1903. The frame mold 1913 may be formed of synthetic resins. For example, the frame mold may be formed of a metal material such as stainless steel or titanium (Ti). The back cover 1915 may be disposed on a rear surface of the electronic device 1900 such that internal components are not viewed. The back cover 1915 may be various films.

According to embodiments of the present disclosure, it may be possible to provide an electronic device capable of effectively using an antenna, which is appropriate to receive a signal, from among a plurality of complex antennas by changing electrical paths between an antenna radiator and a communication circuit using a switching circuit and an extractor.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. An electronic device comprising:
   a housing including a first surface facing a first direction and a second surface facing a second direction opposite to the first direction, wherein the first surface includes a first side having a first length, a second side having a second length longer than the first length, a third side having the first length, and a fourth side having the second length, the first side is perpendicular to the second side and the fourth side and is parallel with the third side;
   a first conductive member extending along at least a part of the first side;
   a second conductive member extending along at least a part of the third side;
   a first wireless communication circuit including a transmission port and at least one first reception port, wherein the at least one first reception port is electrically coupled with at least one of the first conductive member or the second conductive member;
   a second wireless communication circuit including a second reception port;
   a switching circuit configured to selectively provide a first electrical path for electrically coupling the transmission port and the second reception port with the first conductive member or a second electrical path for electrically coupling the transmission port and the second reception port with the second conductive member, the switching circuit including a first switch and a second switch; and
   an extractor electrically coupled with the first switch and the second switch and configured to extract a signal of a second band, from among signals of two or more bands received through the first conductive member or the second conductive member;
   wherein the second switch is coupled between the first wireless communication circuit and the extractor,
   wherein the second wireless communication circuit is coupled with the extractor, and
   wherein the first switch is coupled with the first conductive member and the second conductive member.

2. The electronic device of claim 1, wherein the first wireless communication circuit is configured to provide wireless communication in a frequency range of 0.6 GHz to 2.7 GHz.

3. The electronic device of claim 1, wherein the second wireless communication circuit is configured to provide wireless communication in a frequency range of 1170 MHz to 1580 MHz.

4. The electronic device of claim 1, wherein the second wireless communication circuit is configured to receive a GPS signal.

5. The electronic device of claim 1, wherein the extractor comprises:
   a first extractor coupled with the first conductive member and the second switch; and
   a second extractor coupled with the second conductive member and the second switch,
   wherein the second switch is coupled with the second wireless communication circuit, and
   wherein the first switch is coupled with the first extractor, the second extractor and the first wireless communication circuit.

6. The electronic device of claim 1, wherein the switching circuit is configured to:
   selectively provide the first electrical path or the second electrical path such that the transmission port, the first reception port, or the second reception port is electrically coupled with the first conductive member or the second conductive member, based on at least one of a received signal strength indication (RSSI) of a signal received through the first conductive member or the second conductive member, an application executed in the electronic device, a grip state, acceleration, an angular velocity, a proximity state, or illuminance, measured by the electronic device.

7. The electronic device of claim 1, further comprising:
   a third conductive member extending along at least a part of the second side and adjacent to the first conductive member; and
   a fourth conductive member extending along at least a part of the fourth side and adjacent to the second conductive member,
   wherein the first wireless communication circuit is electrically coupled with the third conductive member and the fourth conductive member.

8. An electronic device comprising:
   a first conductive member configured to receive signals of two or more bands from the outside;
   a second conductive member disposed to be spaced apart from the first conductive member and configured to receive signals of the two or more bands from the outside;
   a first communication circuit configured to process a signal of a first band, from among the signals of the two or more bands;
   a second communication circuit configured to process a signal of a second band, from among the signals of the two or more bands;
   at least one extractor configured to extract a signal of the second band from among signals received through the first conductive member or the second conductive member and to transmit the signal of the second band to the second communication circuit;
   at least one switching circuit electrically connected with the at least one extractor and disposed on at least one of electrical paths between the first conductive member, the second conductive member, the first communication circuit, and the second communication circuit; and a control circuit configured to control the at least one switching circuit based on a specified condition such that each of the first communication circuit and the second communication circuit is selectively connected with the first conductive member or the second conductive member, wherein the at least one switching circuitry includes a first switch and a second switch and the at least one extractor is electrically coupled with the first switch and the second switch, wherein the first communication circuit includes a main signal processing block and a diversity signal processing block, and wherein the control circuit is configured to:

control the at least one switching circuit based on the specified condition such that one of the first conductive member or the second conductive member is connected with the main signal processing block and the other of the first conductive member or the second conductive member is connected with the diversity signal processing block.

9. The electronic device of claim 8, wherein the at least one extractor includes a first extractor and a second extractor, wherein the first switch is disposed to connect the first communication circuit with the first conductive member through the first extractor or to connect the first communication circuit with the second conductive member through the second extractor, wherein the second switch is disposed to connect the second communication circuit with the first conductive member through the first extractor or to connect the second communication circuit with the second conductive member through the second extractor, wherein the first extractor is configured to:

if the second communication circuit is connected with the first conductive member, transmit the signal of the second band from the first conductive member to the second communication circuit through the second switch, and wherein the second extractor is configured to:

if the second communication circuit is connected with the second conductive member, transmit the signal of the second band from the second conductive member to the second communication circuit through the second switch.

10. The electronic device of claim 8, wherein the at least one switching circuit is disposed to connect one of the first conductive member or the second conductive member directly with the first communication circuit and to connect the other of the first conductive member or the second conductive member with the at least one extractor, and wherein the at least one extractor is configured to transmit the signal of the second band, from among signals received through the at least one switching circuit to the second communication circuit.

11. The electronic device of claim 8, wherein the first switch is disposed to connect one of the first conductive member or the second conductive member directly with the second switch and to connect the other of the first conductive member or the second conductive member with the at least one extractor, wherein the at least one extractor is configured to transmit the signal of the second band, from among signals received through the first switch to the second communication circuit, and wherein the second switch is disposed to connect with the at least one extractor and the first switch with the first communication circuit.

12. The electronic device of claim 8, wherein the control circuit is configured to:

control the at least one switching circuit based on a received signal strength indication (RSSI) of a signal received through the first conductive member or the second conductive member such that each of the first communication circuit and the second communication circuit is selectively connected with the first conductive member or the second conductive member.

13. The electronic device of claim 8, further comprising:

a sensing module including at least one of a grip sensor, an acceleration sensor, an angular velocity sensor, a proximity sensor, or an illuminance sensor, wherein the control circuit is configured to:

control the at least one switching circuit based on at least one of a grip state, acceleration, an angular velocity, a proximity state, or illuminance measured by the sensing module such that each of the first communication circuit and the second communication circuit is selectively connected with the first conductive member or the second conductive member.

14. The electronic device of claim 8, wherein the control circuit is configured to:

control the at least one switching circuit such that the first communication circuit is connected with a conductive member, of which an RSSI is relatively high, from among the first conductive member and the second conductive member and the second communication circuit is connected with a conductive member, which is placed at a top, from among the first conductive member or the second conductive member.

15. The electronic device of claim 8, wherein the control circuit is configured to:

if an application associated with the signal of the second band is executed in the electronic device, control the at least one switching circuit such that the first communication circuit and the second communication circuit are connected with a conductive member, which is placed at a top, from among the first conductive member or the second conductive member.

16. The electronic device of claim 8, wherein the control circuit is configured to:

if location information of the electronic device is requested from an external device, control the at least one switching circuit such that the first communication circuit and the second communication circuit are connected with a conductive member, which is placed at a top, from among the first conductive member or the second conductive member; and if the location information is acquired, control the at least one switching circuit such that the first communication circuit and the second communication circuit are connected with a conductive member, of which a received signal strength indication is relatively high, from among the first conductive member or the second conductive member.

17. An electronic device comprising:

a housing including a first surface facing a first direction and a second surface facing a second direction opposite to the first direction, wherein the first surface includes a first side having a first length, a second side having a second length longer than the first length, a third side having the first length, and a fourth side having the second length, the first side is perpendicular to the second side and the fourth side and is parallel with the third side;

a first conductive member extending along at least a part of the first side;

a second conductive member extending along at least a part of the third side;

a first wireless communication circuit including a transmission port and at least one first reception port, wherein the at least one first reception port is electrically coupled with at least one of the first conductive member or the second conductive member;

a second wireless communication circuit including a second reception port;

a switching circuit configured to selectively provide a first electrical path for electrically coupling the transmission port and the second reception port with the first conductive member or a second electrical path for electrically coupling the transmission port and the second reception port with the second conductive member; and an extractor including a first node coupled with the second wireless communication circuit, a second node coupled with the switching circuit, and a third node coupled with the first wireless communication circuit.

* * * * *